(12) United States Patent
Roche et al.

(10) Patent No.: US 12,293,219 B2
(45) Date of Patent: May 6, 2025

(54) METHOD AND SYSTEM FOR PERFORMING DISTRIBUTED COMPUTER VISION WORKLOADS IN A COMPUTER VISION ENVIRONMENT USING A DYNAMIC COMPUTER VISION ZONE

(71) Applicant: Dell Products L.P., Round Rock, TX (US)

(72) Inventors: Ian Roche, Glanmire (IE); Philip Hummel, San Jose, CA (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 553 days.

(21) Appl. No.: 17/581,344

(22) Filed: Jan. 21, 2022

(65) Prior Publication Data
US 2023/0236877 A1    Jul. 27, 2023

(51) Int. Cl.
G06F 9/48 (2006.01)
G06F 9/54 (2006.01)

(52) U.S. Cl.
CPC ............. G06F 9/485 (2013.01); G06F 9/542 (2013.01)

(58) Field of Classification Search
CPC ........ G06F 9/485; G06F 9/542; G06F 9/5061; G06F 2209/502
See application file for complete search history.

(56) References Cited

U.S. PATENT DOCUMENTS

| | | | |
|---|---|---|---|
| 2003/0163289 A1* | 8/2003 | Whelan | H04N 7/181 348/E7.086 |
| 2005/0024206 A1* | 2/2005 | Samarasekera | G08B 13/19689 340/541 |
| 2009/0033746 A1* | 2/2009 | Brown | G08B 13/19641 348/155 |
| 2012/0008931 A1* | 1/2012 | Lee | H04N 23/63 396/287 |
| 2015/0026244 A1* | 1/2015 | Hato | H04L 69/321 709/203 |
| 2015/0116501 A1* | 4/2015 | McCoy | H04N 23/661 348/169 |
| 2016/0219117 A1* | 7/2016 | Marlatt | H04L 67/12 |
| 2018/0018081 A1* | 1/2018 | Dattilo-Green | H04N 7/18 |
| 2018/0332204 A1* | 11/2018 | Chien | H04N 7/186 |
| 2019/0043326 A1* | 2/2019 | Madden | H04N 7/185 |
| 2019/0306408 A1* | 10/2019 | Hofer | H04N 23/90 |
| 2021/0233340 A1* | 7/2021 | Ljung | G06T 7/20 |
| 2022/0391625 A1* | 12/2022 | Rakshit | H04N 23/90 |
| 2022/0400244 A1* | 12/2022 | Schaefer | H04N 7/147 |

* cited by examiner

*Primary Examiner* — Tuan C Dao
(74) *Attorney, Agent, or Firm* — Chamberlain, Hrdlicka, White, Williams & Aughtry; Aly Z. Dossa

(57) ABSTRACT

Techniques described herein relate to a method for managing a computer vision environment. The method includes identifying, by a computer vision (CV) node of a plurality of CV nodes, a CV alert; in response to identifying the CV alert: identifying candidate CV nodes of the plurality of CV nodes; generating a dynamic CV zone using the candidate CV nodes; initiating performance of a CV workload by the dynamic CV zone to generate CV data associated with the CV alert; generating a CV alert case associated with the CV alert; obtaining CV data from the dynamic CV zone; updating the CV alert case using the CV data generated during the performance of the CV workload; and providing the updated CV alert case to a VMS.

15 Claims, 12 Drawing Sheets

METHOD AND SYSTEM FOR PERFORMING DISTRIBUTED COMPUTER VISION WORKLOADS IN A COMPUTER VISION ENVIRONMENT USING A DYNAMIC COMPUTER VISION ZONE

BACKGROUND

Computing devices may provide services. The services may include the performance of computer vision workloads. The performance of the computer vision workloads may result in the identification of computer vision alerts. The computer vision alerts may require acquisition of additional data in order to be resolved. Another computer vision workload may be performed to acquire the required additional data. The physical location associated with the computing devices that perform the computer vision workload may impact the performance of the computer vision workload.

SUMMARY

In general, certain embodiments described herein relate to a method for managing a computer vision environment. The method may include identifying, by a computer vision (CV) node of a plurality of CV nodes, a CV alert; in response to identifying the CV alert: identifying candidate CV nodes of the plurality of CV nodes; generating a dynamic CV zone using the candidate CV nodes; making a determination that a CV node of the dynamic CV zone does not include a CV workload associated with the CV alert; in response to the determination: providing the CV workload to the CV node of the dynamic CV zone; initiating performance of the CV workload by the dynamic CV zone to generate CV data associated with the CV alert; generating a CV alert case associated with the CV alert; obtaining CV data from the dynamic CV zone; updating the CV alert case using the CV data generated during the performance of the CV workload; and providing the updated CV alert case to a VMS.

In general, certain embodiments described herein relate to a system for managing a computer vision environment. The system includes a computer vision (CV) environment that includes CV nodes and a video management system (VMS). The system also includes a CV node of the CV nodes, which includes a processor and memory, and is programmed to: identify a CV alert; in response to identifying the CV alert: identify candidate CV nodes of the plurality of CV nodes; generate a dynamic CV zone using the candidate CV nodes; make a determination that a CV node of the dynamic CV zone does not include a CV workload associated with the CV alert; in response to the determination: provide the CV workload to the CV node of the dynamic CV zone; initiate performance of a CV workload by the dynamic CV zone to generate CV data associated with the CV alert; generate a CV alert case associated with the CV alert; obtain CV data from the dynamic CV zone; update the CV alert case using the CV data generated during the performance of the CV workload; and provide the updated CV alert case to a VMS.

In general, certain embodiments described herein relate to a non-transitory computer readable medium that includes computer readable program code, which when executed by a computer processor enables the computer processor to perform a method for managing a computer vision environment. The method may include identifying, by a computer vision (CV) node of a plurality of CV nodes, a CV alert; in response to identifying the CV alert: identifying candidate CV nodes of the plurality of CV nodes; generating a dynamic CV zone using the candidate CV nodes; making a determination that a CV node of the dynamic CV zone does not include a CV workload associated with the CV alert; in response to the determination: providing the CV workload to the CV node of the dynamic CV zone; initiating performance of the CV workload by the dynamic CV zone to generate CV data associated with the CV alert; generating a CV alert case associated with the CV alert; obtaining CV data from the dynamic CV zone; updating the CV alert case using the CV data generated during the performance of the CV workload; and providing the updated CV alert case to a VMS.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
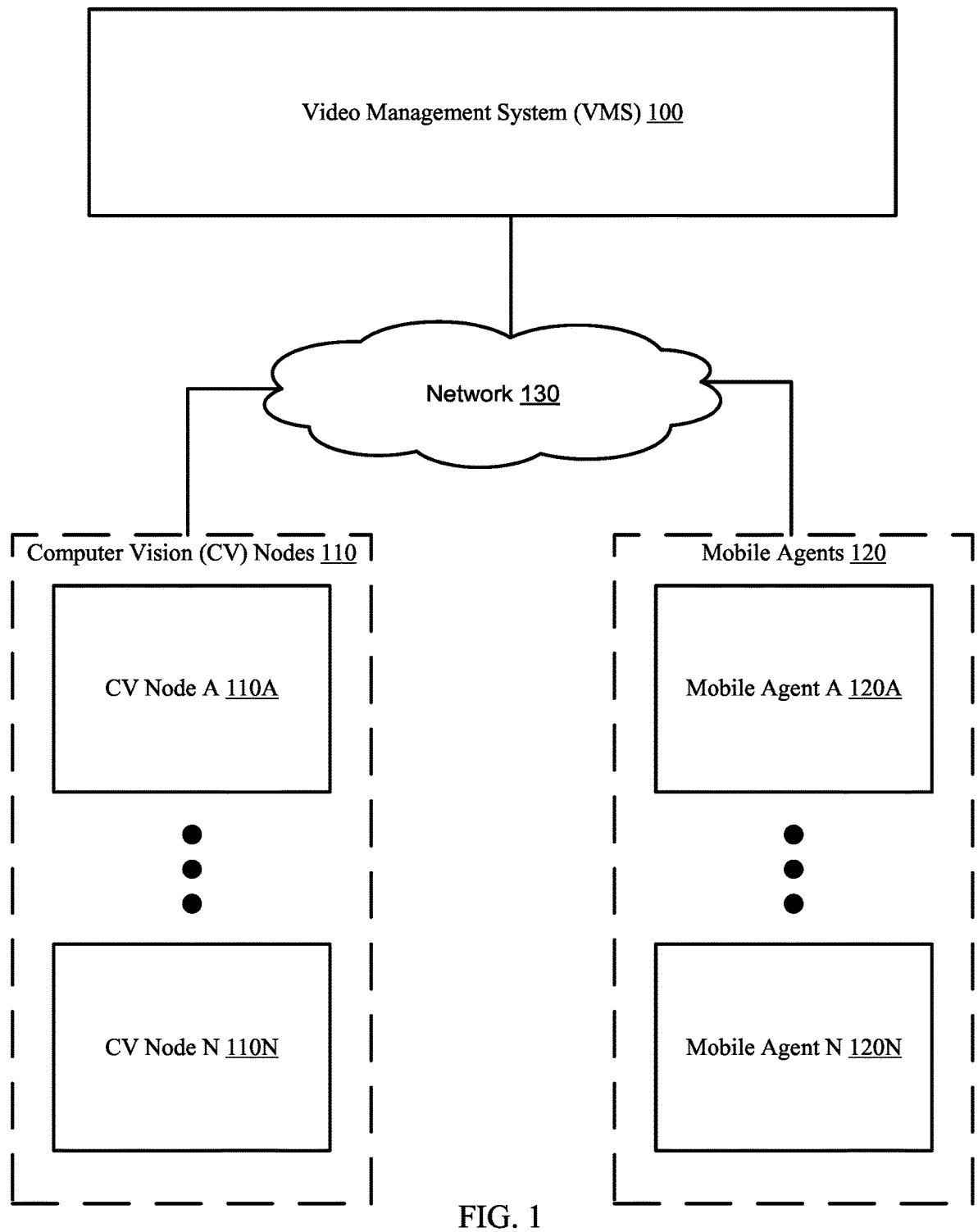
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In general, embodiments of the invention relate to performing a distributed CV workload using a dynamic CV zone. A CV node may identify a CV alert. In response to identifying the CV alert, the CV node may become the CV node leader associated with the CV alert. The CV node leader may identify other candidate CV nodes. The CV node leader may select a set of the candidate nodes based on geolocation information to select CV nodes that provide an optimal video camera coverage associated with a portion of the physical environment corresponding to the CV alert. The CV node leader may generate a dynamic CV zone using the selected CV nodes. The CV node leader may then provide CV workloads associated with the CV alert to CV nodes of the dynamic CV zone that do include them. The CV node leader may then initiate the performance of a distributed CV workload to generate CV data associated with the CV alert by the dynamic CV zone. As a result, by selecting CV nodes of the candidate CV nodes to perform the distributed CV workload based on geolocation information and providing CV workloads associated with the CV alert to CV nodes of the dynamic CV zone, CV nodes that are located in areas more relevant to the distributed CV workload and that include the proper CV workload may be used to perform the distributed CV workload. Therefore, the efficiency and effectiveness of performing CV workloads to generate CV data associated with CV alerts may be improved.

FIG. 1 shows a diagram of a system in accordance with one or more embodiments of the invention. The system may include a video management system (VMS) (100), computer vision (CV) nodes (110), mobile agents (120), and a network (130). The system may be referred to throughout this application as a computer vision (CV) environment. The system may include other, fewer, and/or additional devices and/or components without departing from embodiments disclosed herein. Each of the components of the system is discussed below.

In one or more embodiments of the invention, the VMS (100) includes the functionality to provide management services for the CV nodes (110) and the mobile agents (120). The management services may include: (i) obtaining CV alerts and/or CV alert cases from CV nodes (110) and/or mobile agents (120), (ii) generating CV alert cases associated with CV alerts, (iii) obtaining CV data associated with CV alert cases, (iv) updating CV alert cases, (v) confirming, through a user of the VMS (100), CV alerts, and (vi) managing the investigation and resolution of CV alert cases by providing CV alert cases to mobile agents (120) and users of the VMS (100) for review and investigation of CV alert cases. The management services may include other and/or additional services without departing from the invention. The VMS (100) may include the functionalities to perform all, or a portion thereof, the methods of FIGS. 2C, 4, 6, and 8. The VMS (100) may include other and/or additional functionalities without departing from the invention. For additional information regarding the functionalities of the VMS (100), refer to FIGS. 2C, 4, 6, and 8.

In one or more embodiments disclosed herein, VMS (100) is implemented as one or more computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Figure 10:
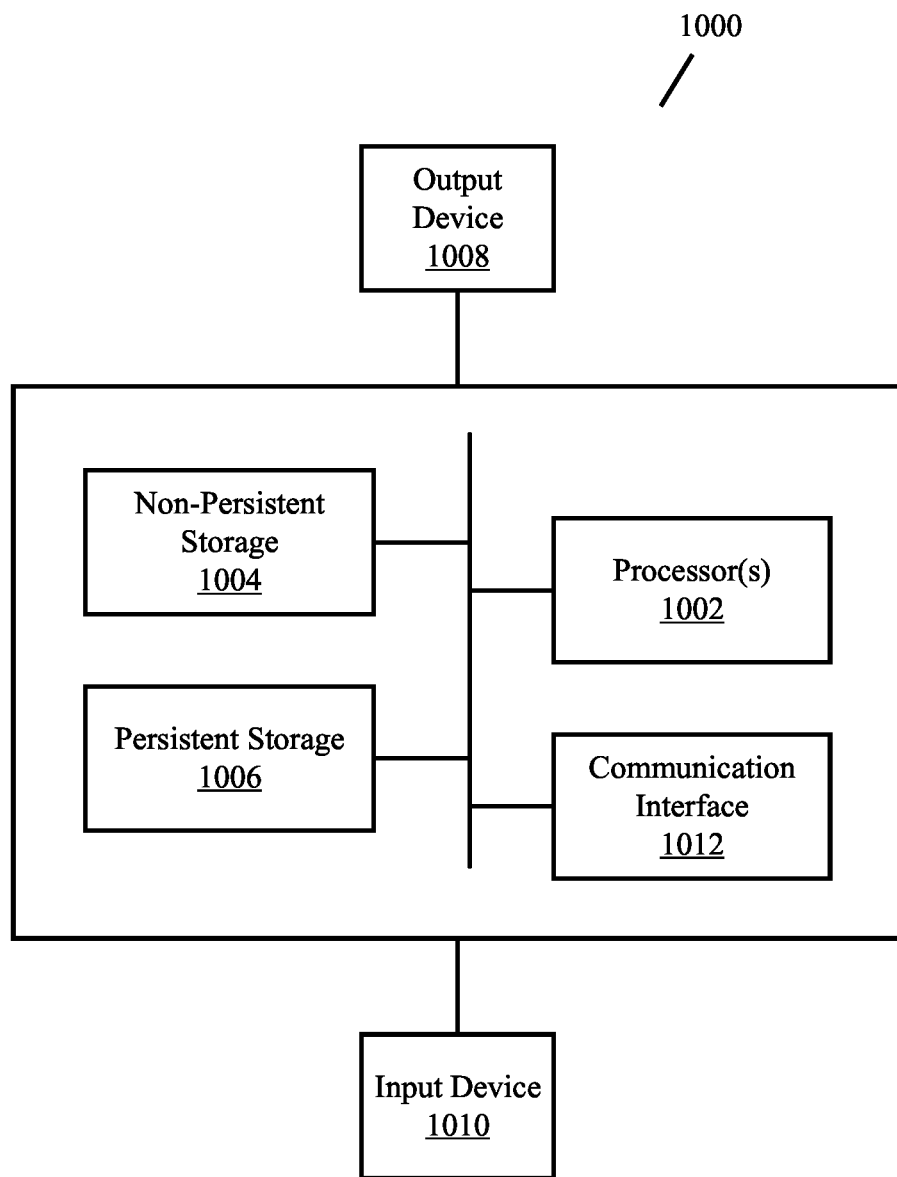
FIG. 10 shows a diagram of a computing device in accordance with one or more embodiments of the invention.

For additional information regarding computing devices, refer to FIG. 10.

In one or more embodiments of the invention, the CV nodes (110) include the functionality to perform CV workloads. The CV workloads may include any type of CV workload without departing from the invention. The CV workloads may include, for example, facial recognition, object detection, object counting, object tracking, inferencing, etc. The CV workloads may be distributed CV workloads (i.e., CV workloads performed across any number of CV nodes (110) and/or mobile agents (120)). Each CV node of the CV nodes (110) may perform similar or different CV workloads without departing from the invention. The CV nodes (110) may include any quantity of CV nodes (110) without departing from the invention. For example, the CV nodes (110) may include CV node A (110A) and CV node N (110N). The CV nodes (110) may include the functionality to perform all, or a portion of, the methods of FIGS. 2A, 2C, 4, 6, and 8. The CV nodes (110) may include other and/or additional functionalities without departing from the invention. For additional information regarding the functionalities of the CV nodes (110), refer to FIGS. 2A, 2C, 4, 6, and 8.

In one or more embodiments of the invention, the CV nodes (110) are implemented as one or more computing devices that include and/or are otherwise operatively connected to a camera. For additional information regarding computing devices, refer to the above discussion and/or FIG. 10.

As mentioned above, the CV nodes (110) may include and/or be operatively connected to one or more cameras. The cameras may capture and/or record video data. The cameras may include any appropriate type of device (e.g., pan-tilt-zoom cameras, webcams, camcorders, smartphones, etc.) for capturing, recording, broadcasting, and/or streaming video data without departing from the invention. The cameras may provide (e.g., stream, broadcast, transmit, etc.) the video data to the CV nodes (110) to perform CV workloads using the video data. The video data may include any appropriate type of video data and/or video data format without departing from the invention.

During the performance of CV workloads or distributed CV workloads, CV nodes (110) may process raw video data to generate CV data. CV data may include all, or a portion of, the raw video data and any other relevant data associated with the CV workload without departing from the invention. The other relevant data may include objects detected, faces recognized, geolocation information, object identifiers, facial identifiers, timestamps, etc. The other relevant data may include other types of data associated with any CV workload without departing from the invention.

In one or more embodiments of the invention, the CV environment is associated with a physical environment. In other words, the CV nodes (110) and the mobile agents (120) may be deployed throughout a physical environment. The physical environment may be any type of physical environment associated with any type of physical layout without departing from the invention. The physical environment may include, for example, an airport, a mall, a casino, a street corner, etc. Each CV node (e.g., 110A) and mobile agent (e.g., 120A) may be deployed to or otherwise operate in a portion of the physical environment. As an example, a first CV node (e.g., 110A) may include a camera capturing video data in a first terminal of an airport, a second CV node (e.g., 110N) may include a camera capturing video data in a first baggage claim of an airport, etc. Geolocation information associated with the CV nodes (110) and the mobile agents (120) may specify the portions of the physical environment in which the CV nodes (110) and mobile agents (120) are operating. The geolocation information may include, for example, coordinates, location identifiers (i.e., unique combinations of alphanumeric characters associated with particular portions of the physical environment), and/or other types of information that may specify the portions of the physical environment without departing from the invention.

In one or more embodiments of the invention, mobile agents (120) include the functionality to perform CV workloads. The CV workloads may include any type of CV workload without departing from the invention. The CV workloads may include, for example, facial recognition, object detection, object counting, object tracking, inferencing, etc. The CV workloads may be distributed CV workloads (i.e., CV workloads performed across any number of mobile agent and/or CV nodes). Each mobile agent of the mobile agent (120) may perform similar or different CV workloads without departing from the invention. The mobile agents (120) may include any quantity of mobile agents (120) without departing from the invention. For example, the mobile agents (120) may include mobile agent A (120A) and mobile agent N (120N). The mobile agents (120) may include the functionality to perform all, or a portion of, the methods of FIGS. 2B, 2C, 4, 6, and 8. The mobile agents (120) may include other and/or additional functionalities without departing from the invention. For additional information regarding the functionalities of the mobile agents (120), refer to FIGS. 2B, 2C, 4, 6, and 8.

In one or more embodiments of the invention, the mobile agents (120) are implemented as one or more mobile computing devices that include and/or are otherwise operatively connected to a camera for recording video data and a display for providing video data to a user. The mobile computing devices may include any device for capturing video data, performing CV workloads, and displaying video data and/or CV data for users of the mobile computing devices. The mobile computing devices may include, for example, augmented reality glasses, mobile phones, and other and/or additional types of mobile computing devices without departing from the invention. For additional information regarding computing devices, refer to the above discussion and/or FIG. 10.

In one or more embodiments of the invention, each of the mobile agents (120) is worn or otherwise in the possession of a user. The user is free to move about the physical environment associated with the CV environment. As a result, the mobile agents (120) may also move about the physical environment as their respective users move about the physical environment. For example, a mobile agent (e.g., 120A) worn by a security guard of a mall may move from store to store within the mall as the security guard patrols the mall. Therefore, mobile agents (120) may be used to investigate CV alerts.

In one or more embodiments of the invention, each of the components of the CV environment (the VMS (100), CV nodes (110), and mobile agents (120)) may be operatively connected by the network (130). The network (130) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, the network (130) may include any number of devices. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols or languages, which may include discovery schemes by which a given device (e.g., CV nodes (110)) may obtain information about, and/or provide data and information to, all or any of the network topology in which the devices exists. Such network protocols and/or languages may include sharing of information between network devices, and may also include providing information to other devices within the CV environment, such as, for example, the VMS (100), CV nodes (110), and mobile agents (120) (discussed above).

While FIG. 1 shows a configuration of components, other configurations may be used without departing from the scope of embodiments described herein. Accordingly, embodiments disclosed herein should not be limited to the configuration of components shown in FIG. 1.

Figure 2A:
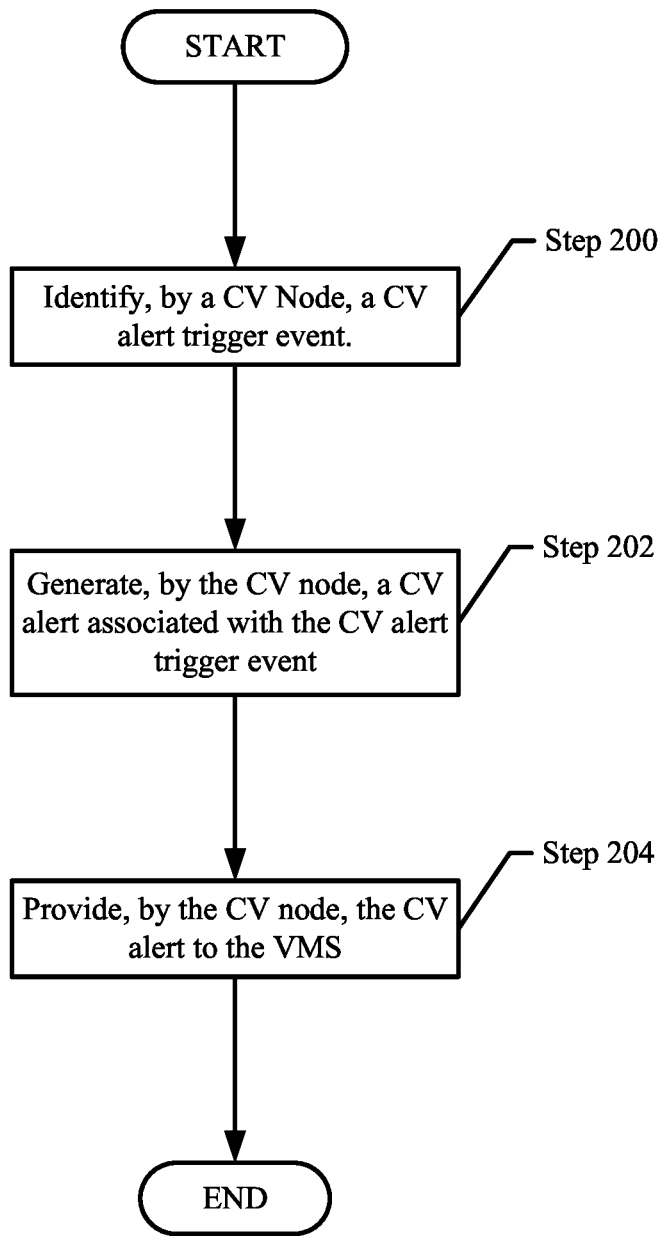
FIG. 2A shows a flowchart of a method for detecting a CV alert trigger event by a CV node in accordance with one or more embodiments of the invention.
Figure 2B:
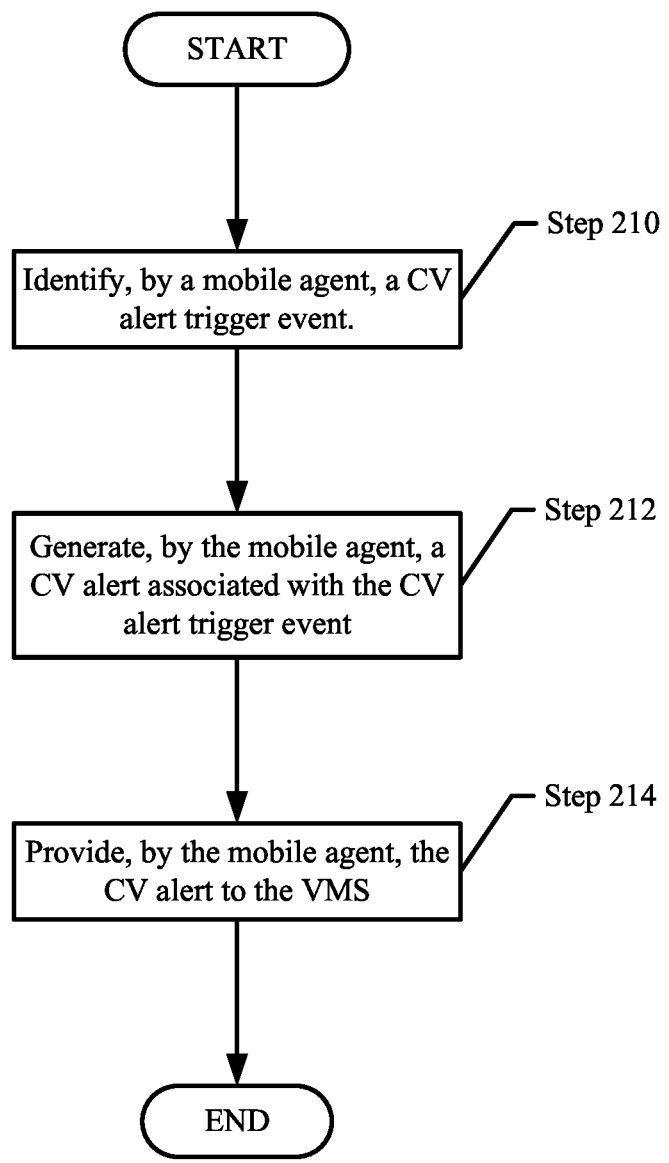
FIG. 2B shows a flowchart of a method for detecting a CV alert trigger event by a mobile agent in accordance with one or more embodiments of the invention.
Figure 2C:
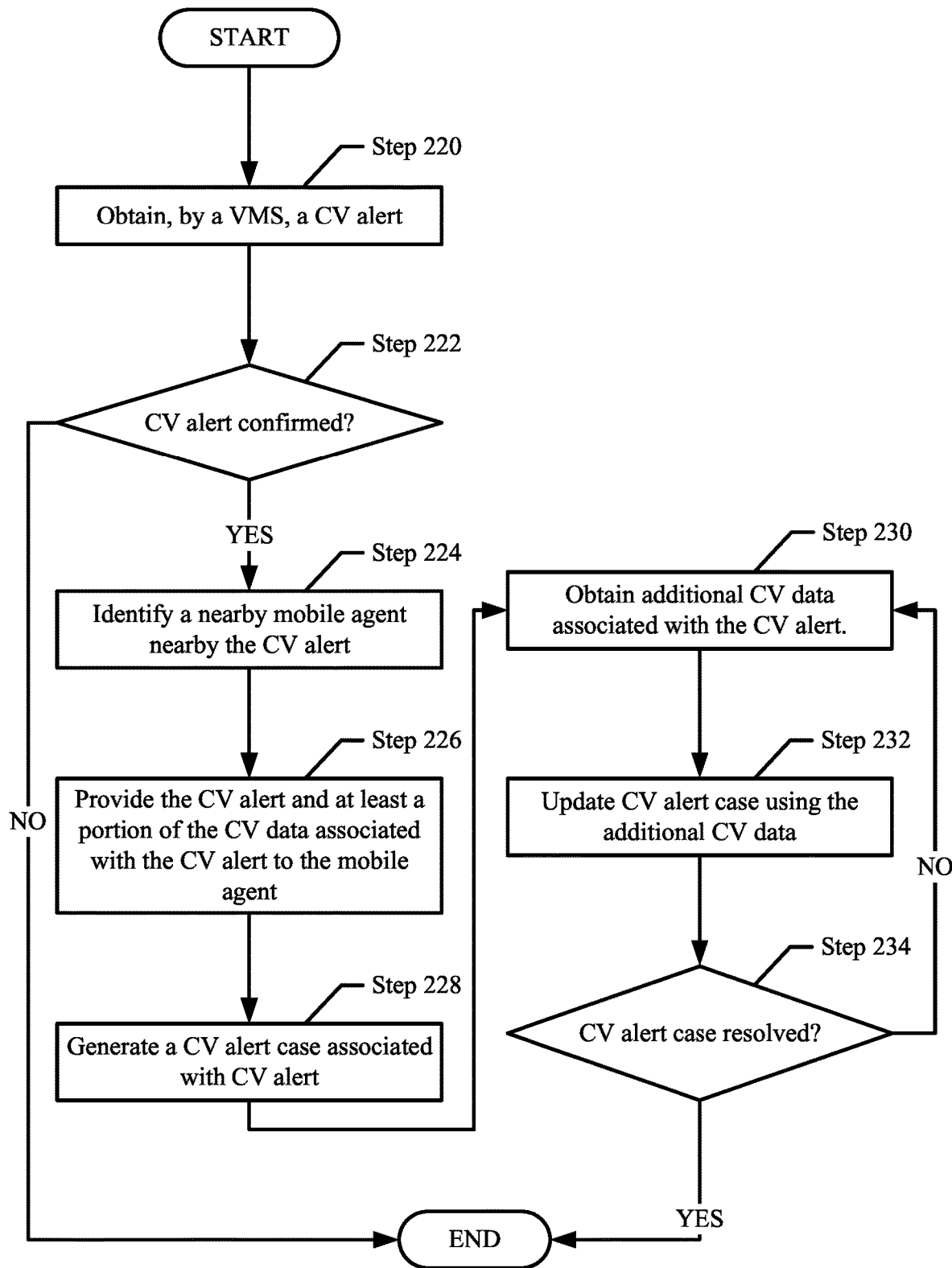
FIG. 2C shows a flowchart of a method for managing a CV alert in accordance with one or more embodiments of the invention.

As discussed above, the system of FIG. 1 may identify CV alerts by executing CV workloads for a CV environment using CV nodes. FIGS. 2A-2C show methods that may be performed by components of the system of FIG. 1 to manage CV alerts during the performance of CV workloads in a CV environment.

Turning to FIG. 2A, FIG. 2A shows a flowchart of a method for detecting a CV alert trigger event by a CV node in accordance with one or more embodiments of the invention. The method shown in FIG. 2A may be performed by, for example, a CV node (e.g., 110A, FIG. 1). Other components of the system in FIG. 1 may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In Step 200, a CV alert trigger event is identified by a CV node. As discussed above, the CV node may execute one or more CV workloads. Executing a CV workload may include processing video data obtained from the camera associated with the CV node to identify CV alert trigger events. The CV alert trigger event may be associated with the type of CV workload executing on the CV node. For example, for a CV node executing an object detection workload for identifying abandoned bags may process video data obtained in a terminal of an airport. As video data is recorded by the camera, the CV workload may processes the video data to identify any abandoned bags. The identification of an abandoned bag by the CV node may be the CV alert trigger event. The CV alert trigger event may be identified by the CV node via other and/or additional methods without departing from the invention.

In Step 202, a CV alert associated with the CV alert trigger event is generated by the CV node. In one or more embodiments of the invention, the CV node generates the CV alert by generating a data structure that includes a notification descriptive of the CV alert trigger event. Continuing with the above example, for the CV alert trigger event of detecting an abandoned bag, the CV alert may include a notification associated with the detection of an abandoned bag. Additionally, the CV node may include information associated with the CV alert trigger event in the CV alert. The information may include a timestamp indicating the point in time in which the CV alert trigger event was identified. The information may further include geolocation information (e.g., coordinates, room identifier, terminal identifier, etc.) specifying the physical location in which the CV alert trigger event occurred. The CV node may also include the video data associated with the CV alert trigger event. The CV node may also include previous video data (i.e., video data for a previous length of time prior to the identification of the CV alert trigger event) associated with the CV alert trigger event. The CV alert may include other and/or additional information associated with the CV alert trigger event without departing from the invention. The CV alert associated with the CV alert trigger event may be generated by the CV node via other and/or additional methods without departing from the invention.

In Step 204, the CV alert is provided to the VMS by the CV node. In one or more embodiments of the invention, the CV node sends a message to the video management system (VMS). The message may include the CV alert. The message may include other and/or additional information without departing from the invention. The message may sent to the VMS using any appropriate method of data transmission without departing from the invention. As an example, the message may be transmitted as data packets through one or more network devices that operatively connect the CV node to the VMS. The CV alert may be provided to the VMS by the CV node via other and/or additional methods without departing from the invention.

In one or more embodiments of the invention, the method ends following Step 204.

FIG. 2B shows a flowchart of a method for detecting a CV alert trigger event by a mobile agent in accordance with one or more embodiments of the invention. The method shown in FIG. 2B may be performed by, for example, a mobile agent (e.g., 120A, FIG. 1). Other components of the system in FIG. 1 may perform all, or a portion, of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In Step 210, a CV alert trigger event is identified by a mobile agent. As discussed above, the mobile agent may execute one or more CV workloads. Executing a CV workload may include processing video data obtained from the camera associated with the mobile agent to identify CV alert trigger events. The CV alert trigger event may be associated with the type of CV workload executing on the Mobile agent. For example, for a mobile agent executing an object detection workload for identifying abandoned bags may process video data obtained in a terminal of an airport. As video data is recorded by the camera, the CV workload may processes the video data to identify any abandoned bags. The identification of an abandoned bag by the mobile agent may be the CV alert trigger event. The CV alert trigger event may be identified by the mobile agent via other and/or additional methods without departing from the invention.

In other embodiments of the invention, a user of the mobile agent may manually identify the CV alert trigger event. As discussed above the mobile agents may be worn or otherwise used by users (e.g., security workers) operating in the physical environment associated with the CV environment. The user of the mobile agent may identify a CV alert trigger event while operating in the physical environment. As an example, a security officer monitoring the baggage claim of an airport may identify an abandoned bag. The security officer may trigger the generation of a CV alert using the mobile agent associated with the security officer. The mobile agent may identify the trigger of the generation of a CV alert by the security officer as the CV alert trigger event. The CV alert trigger event may be identified by the mobile agent via other and/or additional methods without departing from the invention.

In Step 212, a CV alert associated with the CV alert trigger event is generated. In one or more embodiments of the invention, the mobile agent generates the CV alert by generating a data structure that includes a notification descriptive of the CV alert trigger event. Continuing with the above example, for the CV alert trigger event of detecting an abandoned bag, the CV alert may include a notification associated with the detection of an abandoned bag. Additionally, the mobile agent may include information associated with the CV alert trigger event in the CV alert. The information may include a timestamp indicating the point in time in which the CV alert trigger event was identified. The information may further include geolocation information (e.g., coordinates, room identifier, terminal identifier, etc.) specifying the physical location in which the CV alert trigger event occurred. The mobile agent may also include the video data associated with the CV alert trigger event. The mobile agent may also include previous video data (i.e., video data for a previous length of time prior to the identification of the CV alert trigger event) associated with the CV alert trigger event. The CV alert may include other and/or additional information associated with the CV alert trigger event without departing from the invention. The CV alert associated with the CV alert trigger event may be generated by the mobile agent via other and/or additional methods without departing from the invention.

In Step 214, the CV alert is provided to the VMS by the mobile agent. In one or more embodiments of the invention, the mobile agent sends a message to the video management system (VMS). The message may include the CV alert. The message may include other and/or additional information without departing from the invention. The message may sent to the VMS using any appropriate method of data transmission without departing from the invention. As an example, the message may be transmitted as data packets through one or more network devices that operatively connect the mobile agent to the VMS. The CV alert may be provided to the VMS by the mobile agent via other and/or additional methods without departing from the invention.

In one or more embodiments of the invention, the method ends following Step 214.

FIG. 2C shows a flowchart of a method for managing a CV alert in accordance with one or more embodiments of the invention. The method shown in FIG. 2C may be performed by, for example, a VMS (e.g., 100, FIG. 1). Other components of the system in FIG. 1 may perform all, or a portion, of the method of FIG. 2C without departing from the invention.

While FIG. 2C is illustrated as a series of steps, any of the steps may be omitted, performed in a different order, additional steps may be included, and/or any or all of the steps may be performed in a parallel and/or partially overlapping manner without departing from the invention.

In Step 220, a CV alert is obtained by the VMS. As discussed above, a CV node or a mobile agent may provide CV alerts to the VMS. The CV alert may obtain CV alerts using methods described above in Step 204 of FIG. 2A and Step 214 of FIG. 2B. The CV alert may be obtained by the VMS via other and/or additional methods without departing from the invention.

In Step 222, a determination is made as to whether the CV alert is confirmed. The VMS may provide the CV alert to a user (e.g., security official) of the VMS with a prompt to confirm the CV alert. CV nodes and mobile agents may generate CV alerts that are false alarms or otherwise inaccurate. To avoid generating a CV alert case associated with a false or inaccurate CV alert, the VMS may seek confirmation of the CV alert from the user. The user may review the CV alert and determine whether to confirm the CV alert is a legitimate CV alert. The user may respond to the prompt with a message that indicates that the user confirms the CV alert or that the user does not confirm the CV alert. In one or more embodiments of the invention, if the message obtained from the user indicates that the user confirms the CV alert, then the VMS determines that the CV alert is confirmed. In one or more embodiments of the invention, if the message obtained from the user indicates that the user does not confirm the CV alert, then the VMS determines that the CV alert is not confirmed.

In one or more embodiments of the invention, if it is determined that the CV alert is confirmed, then the method proceeds to Step 224. In one or more embodiments of the invention, if it is determined that the CV alert is not confirmed, then the VMS ignores the CV alert and the method ends following Step 222.

In Step 224, a mobile agent nearby the CV alert is identified. As discussed above, the CV alert may include geolocation information associated with the physical location of the CV alert trigger event corresponding to the CV alert. The VMS may use the geolocation information to identify one or more nearby mobile agents. The VMS may monitor and/or otherwise have access to the geolocation information associated with currently deployed mobile agents. The VMS may compare the geolocation information included in the CV alert with the geolocation information associated with the currently deployed mobile agents to identify the one or more mobile agents that are closest to the geolocation information associated with the CV alert. The VMS may identify nearby mobile agents that execute CV workloads associated with the CV alert. For example, the VMS may identify nearby mobile agents executing an object detection CV model associated with abandoned bags associated with a CV alert for an abandoned bag. The mobile agent nearby the CV alert may be identified via other and/or additional methods without departing from the invention.

In Step 226, the CV alert and at least a portion of the CV data associated with the CV alert is provided to the mobile agent. In one or more embodiments of the invention, the VMS sends a message to the nearby mobile agent. The message may include the CV alert and at least a portion of the CV data associated with the CV alert. The message may include other and/or additional information without departing from the invention. The message may sent to the mobile agent using any appropriate method of data transmission without departing from the invention. As an example, the message may be transmitted as data packets through one or more network devices that operatively connect the mobile agent to the VMS. The CV alert and at least a portion of the CV data associated with the CV alert may be provided to the mobile agent via other and/or additional methods without departing from the invention.

In response to obtaining the CV alert and the CV alert data, the mobile agent may provide the CV alert and the CV alert data to the user of the mobile agent. The user of the mobile agent may use the CV alert and the CV data associated with the CV alert to go to the location of the CV alert and investigate and/or resolve the CV alert.

In Step 228, a CV alert case associated with the CV alert is generated. In one or more embodiments of the invention, the VMS generates the CV alert case using the CV alert and CV data associated with the CV alert. The CV alert case may be a data structure that includes all information relevant to the CV alert. The CV alert case may include a CV alert identifier associated with the CV alert. The CV alert case may further include the CV node identifier(s) and mobile agent identifier(s) associated with CV nodes and mobile agents cooperating in generating CV data associated with the CV alert and investigating the CV alert. The CV alert case may include other and/or additional information associated with the CV alert without departing from the invention.

The VMS may, for CV alerts associated with multiple physical locations (e.g., tracking an individual throughout the CV environment), identify additional CV nodes throughout the physical locations associated with the CV environment to obtain CV data associated with the CV alert. The VMS may include the CV node identifiers associated with the additional CV nodes in the CV alert case.

In Step 230, additional CV data associated with the CV alert is obtained. The VMS may request and/or be provided with additional CV data associated with the CV alert as the CV alert is investigated. The CV nodes and/or the mobile agents associated with the CV alert may provide the additional CV data associated with the CV alert over time as the CV alert is investigated. The CV data may be streamed to the VMS, provided periodically (e.g., sent to the VMS every thirty seconds), or provided to the VMS based on a request. Additional CV data associated with the CV alert may be obtained via other and/or additional methods without departing from the invention.

In Step 232, the CV alert case is updated using the additional CV data. The VMS may update the CV alert case with the additional CV data obtained from the mobile agents and/or the CV nodes associated with the CV alert. A user of the VMS may monitor the CV alert case to check the CV data associated with CV alert in order to investigate the CV alert. Additionally, all, or a portion of, the additional CV data may be provided to mobile agents associated with the CV alert. The mobile agents may provide the additional CV data to the users of the mobile agents. The users of the mobile agents may use the additional CV data in the investigation of the CV alert. The CV alert case may be updated using the additional CV data via other and/or additional methods without departing from the invention.

In Step 234, a determination is made as to whether the CV alert case is resolved. The VMS may obtain a notification that the CV alert case is resolved. The notification may be obtained from a user of the VMS or the mobile agent. As discussed above, a user of the VMS may use the CV alert case to investigate the CV alert. Similarly, users of mobile agents may also investigate the CV alert. The user of the VMS or the users of the mobile agent may determine that the investigation has ended and the CV alert associated with the CV alert is resolved (e.g., abandoned bag obtained, person of interest detained, etc.). In response to the determination, the user of the VMS or the user of a mobile agent may send the notification that the CV alert case is resolved to the VMS. In one or more embodiments of the invention, if the VMS obtains a notification that the CV alert associated with the CV alert case is resolved, then the VMS determines that the CV alert case is resolved. In one or more embodiments of the invention, if the VMS does not obtain a notification that the CV alert associated with the CV alert case is resolved, then the VMS determines that the CV alert case is not resolved.

In one or more embodiments of the invention, if it is determined that the CV alert case is resolved, then the method ends following Step 224. The VMS may delete the CV alert case or archive the CV alert case for further analysis. In one or more embodiments of the invention, if it is determined that the CV alert case is not resolved, then the method proceeds to Step 220. The VMS may repeat Steps 230, 232, and 234 until the CV alert case is resolved.

FIRST EXAMPLE

The following section describes a first example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to be simple examples to illustrate, at least in part, concepts described herein.

Figure 3:
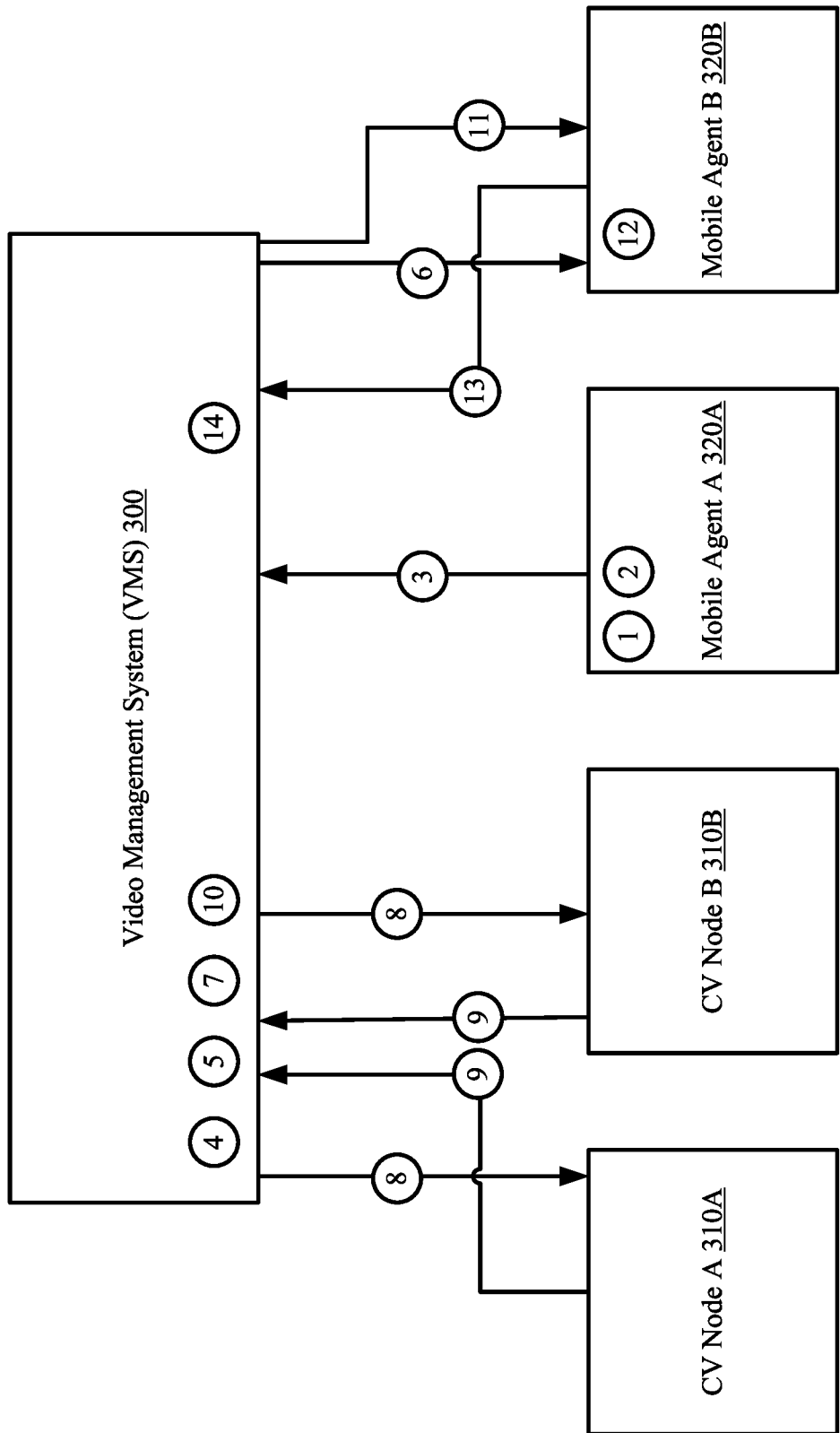
FIG. 3 shows a diagram of a first example in accordance with one or more embodiments of the invention.

Turning to FIG. 3, FIG. 3 shows a diagram of a first example in accordance with one or more embodiments of the invention. Consider a scenario in which a CV environment is operating in an airport. The CV environment includes a video management system (VMS) (300), two CV nodes (CV node A (310A) and CV node B (310B)) and two mobile agents (mobile agent A (320A) and mobile agent B (320B)). The CV nodes (310A, 310B) and the mobile agents (320A, 320B) each are executing a facial recognition CV workload. CV node A (310A) includes a camera recording the security checkpoint of the airport and CV node B (310B) includes a camera recording a terminal of the airport. Mobile agent A (320A) includes augmented reality glasses worn by a security worker checking bags at the security checkpoint. Mobile agent B (320B) includes augmented reality glasses worn by a security worker patrolling the terminal.

At Step 1, the security worker checking bags identifies a person walking the security checkpoint performing some suspicious activity. Due to the fact that the security worker cannot abandon his post checking bags, the security worker manually triggers the identification of a CV alert trigger event by mobile agent A (320A) associated with the suspicious person. In response to identifying the CV alert trigger event, at Step 2, mobile agent A (320A) generates a CV alert associated with the suspicious person. The CV alert includes the location of the suspicious person the video of the suspicious persons face. After generating the CV alert, at Step 3, mobile agent A (320A) provides the CV alert to the VMS (300).

In response to obtaining the CV alert, at Step 4, the VMS (300) provides the CV alert to a user of the VMS (300). The user then checks the video included in the CV alert and confirms that the person is in fact suspicious and should be investigated. The user of the VMS (300) inputs the confirmation associated with the CV alert to the VMS (300). Based on the confirmation, the VMS (300) determines that the CV alert is confirmed. In response to the determination, at Step 5, the VMS (300) uses the video data included in the CV alert to identify that the suspicious person was heading to the terminal Based on the determination, the VMS (300) identifies the mobile agent, mobile agent B (320B) is patrolling the terminal. At Step 6, the VMS (300) provides the CV alert to mobile agent B (320B). In response to obtaining the CV alert, mobile agent B (320B) provides the CV alert to the security worker patrolling the terminal. The security worker may then use the CV alert and the CV data included in the CV alert and the CV workload executing in mobile agent B (320B) to identify and investigate the suspicious individual.

After providing the CV alert to mobile agent B (320B), the VMS (300), at Step 7, generates a CV alert case associated with the CV alert. The CV alert case may include the CV alert and the video data associated with the CV alert. The VMS (300) may also, at Step 8, request for CV data (i.e., facial recognition video data) from CV node A (310A) and CV node B (310B). In response to obtaining the request, at Step 9, CV node A (310A) and CV node B (310B) send previously recorded CV data and streams newly generated CV data to the VMS (300). At step 10, the VMS (300) updates the CV alert case associated with the CV data using CV data obtained from CV node A (310A) and CV node B (310B). A user of the VMS (300) may use the CV data included in the updated CV alert case to identify and track the suspicious person. The VMS (300) may also, at Step 11, provide the updated CV alert case to mobile agent B (320B), and the security worker patrolling the terminal may use the additional CV data included in updated CV alert case to aid in locating the suspicious individual.

Figure 4:
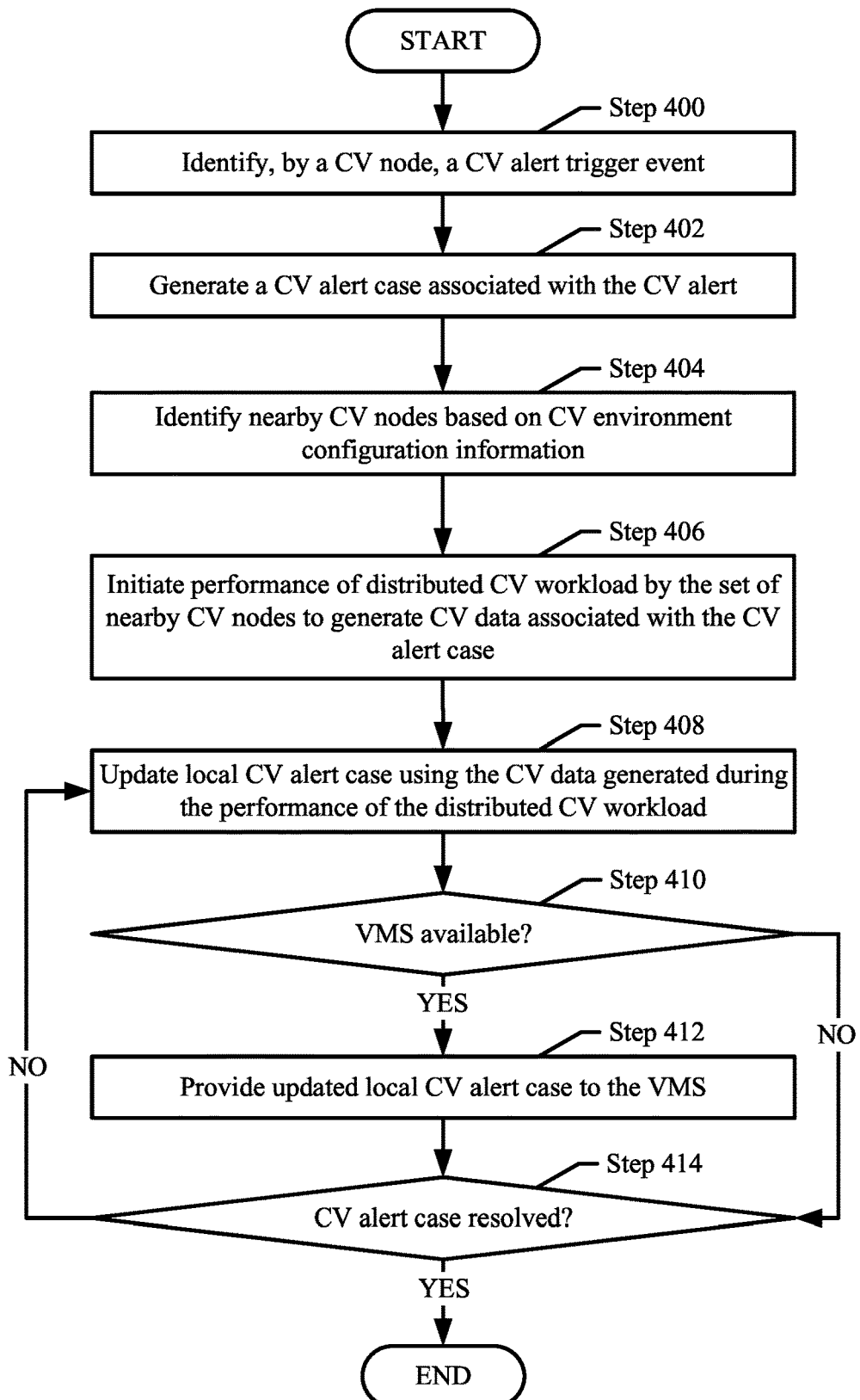
FIG. 4 shows a flowchart of a method for performing a distributed CV workload in accordance with one or more embodiments of the invention.

At some point in time after obtaining the updated CV alert case, at Step 12, the security worker may locate and detain the suspicious person. The security worker may submit to mobile agent B (320B) a CV alert case resolution notification indicating that the CV alert case is resolved. After obtaining the notification, at Step 13, mobile agent B (320B) forwards the notification that the CV alert case is resolved to the VMS (300). In response to obtaining the notification, at Step 14, the VMS (300) determines that the CV alert case is resolved. In response to the determination, the VMS (300) archives the CV alert case for any potential future analysis (e.g., legal analysis) of the activity of the suspicious person. End of First Example FIG. 4 shows a flowchart of a method for performing a distributed CV workload in accordance with one or more embodiments of the invention. The method shown in FIG. 4 may be performed by, for example, a CV node (e.g., 110A, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In Step 400, a CV alert trigger event is identified by the CV node. The CV node may identify a CV alert trigger event using the methods discussed above in Step 200 of FIG. 2A. The CV node may also generate a CV alert based on the CV alert trigger event using the message discussed above in Step 202 of FIG. 2A. The CV alert trigger event may be identified by the CV node via other and/or additional methods without departing from the invention.

In Step 402, a CV alert case associated with the CV alert is generated. In one or more embodiments of the invention, the CV node generates the CV alert case using the CV alert and CV data associated with the CV alert. The CV alert case may be a data structure that includes all information relevant to the CV alert generated by the CV node. The CV alert case may include a CV alert identifier associated with the CV alert. The CV alert case may include other and/or additional information associated with the CV alert without departing from the invention. The CV alert case associated with the CV alert may be generated via other and/or additional methods without departing from the invention.

In Step 404, nearby CV nodes are identified based on CV environment configuration information. As discussed above, CV environment configuration information may include CV node identifiers, geolocation information, and communication information (e.g., network addresses, encryption keys, security/authentication information, etc.) associated with nearby CV nodes with which the CV node may initiate the performance of the distributed CV workload. The CV node may include the CV environment configuration information in a storage of the CV node. The CV node may be configured to identify all of the other CV nodes specified in the CV node configuration information as the nearby CV nodes. The nearby CV nodes may be identified based on CV environment configuration information via other and/or additional methods without departing from the invention.

In Step 406, the performance of a distributed CV workload by the nearby CV nodes to generate CV data associated with the CV alert case is initiated. In one or more embodiments of the invention, the CV node sends requests for performing the distributed CV workload to the nearby CV nodes. The request may include the CV alert case associated with the CV alert. The request may also include instructions for executing the distributed CV workload. The CV node may send the requests using any appropriate peer-to-peer communication language without departing from the invention. The CV node may use the communication information included in the CV environment configuration information to submit the request to perform the distributed CV workload to the nearby CV nodes.

In response to obtaining the request to perform the CV workloads, each CV node of the nearby CV nodes may determine whether to perform the distributed workload. If the CV node includes the capacity to perform the distributed CV workload, the CV node may determine to perform the distributed CV workload. If the CV node does not include the capacity to perform the distributed CV workload, the CV node may determine to not perform the distributed CV workload. If a CV node determines not to perform the distributed CV workload, the CV node may continue to perform the current CV workloads executing on the CV workload. Each CV node that determines to perform the distributed CV workload may begin executing the distributed workload. As a result, each CV node may generate a local CV alert case which may include a copy of the CV data and the CV alert generated by each CV node. During the execution of the distributed CV workload, each CV node may update the corresponding local CV alert case with CV data generated by the CV node. The performance of the distributed workload by the nearby CV nodes to generate CV data associated with the CV alert case may be initiated via other and/or additional methods without departing from the invention.

In Step 408, the local CV alert cases are updated using CV data generated during the performance of the distributed CV workload. As discussed above, while the distributed CV workload is being performed, each CV node (the CV node that identified the CV alert and the nearby CV nodes) may generate CV data associated with the CV alert. Each CV node may update the local CV alert case associated with the CV node with the CV data generated by the CV node as part of executing the CV workload over time. The local CV alert cases may be updated using CV data generated during the performance of the distributed CV workload via other and/or additional methods without departing from the invention.

In Step 410, a determination is made as to whether the VMS is available. The VMS may be rendered unavailable to the CV nodes for any reason without departing from the invention. For example, the VMS may experience a power failure, a nefarious attack by hackers, or any other type of failure that may result in the unavailability of the VMS. In one or more embodiments of the invention, the CV nodes may attempt to contact the VMS. The VMS may respond to the contact attempt with an affirmative message if it is available. The CV nodes may wait a configurable time before timing out of attempt to contact the VMS. In one or more embodiments of the invention, if the CV nodes obtain an affirmative response from the VMS after attempting to contact the VMS, then the CV nodes may determine that the VMS is available. In one or more embodiments of the invention, if the CV nodes timeout while attempting to contact the VMS, then the CV nodes may determine that the VMS is not available. The determination as to whether the VMS is available may be made via other and/or additional methods without departing from the invention.

In one or more embodiments of the invention, if it is determined that the VMS is available, the method proceeds to Step 410. In one or more embodiments of the invention, if it is determined that the VMS is available, the method proceeds to Step 414.

In Step 412, the updated local CV alert cases are provided to the VMS. In one or more embodiments of the invention, the CV node provides the updated local CV alert case to the VMS. Similarly, each CV node of the nearby CV nodes executing the distributed CV workload may also provide the updated local CV alert case of the CV node to the VMS. In one or more embodiments of the invention, the CV nodes send messages to the VMS. The messages may include the local CV alert cases associated with the CV nodes. The messages may include other and/or additional information without departing from the invention. The messages may be sent to the VMS using any appropriate method of data transmission without departing from the invention. As an example, the messages may be transmitted as data packets through one or more network devices that operatively connect the CV nodes to the VMS. The updated local CV alert cases may be provided to the VMS via other and/or additional methods without departing from the invention.

As a result, the VMS may collate the local CV alert cases into a single CV alert case associated with the CV alert. The single CV alert case may include the CV node identifiers associated with the CV nodes performing the distributed CV workload. A user of the VMS may use the single CV alert case associated with the CV alert to investigate and resolve the CV alert. The VMS may also provide the CV alert and all, or a portion of the CV data to nearby mobile agents, which may in turn provide the CV alert and the CV data to users to locate, investigate, and resolve the single CV alert case.

In Step 414, a determination is made as to whether the CV alert case is resolved. The VMS may obtain a notification that the CV alert case is resolved. The notification may be obtained from a user of the VMS or a mobile agent. As discussed above, a user of the VMS may use the single CV alert case to investigate the CV alert. Similarly, users of mobile agents may also investigate the CV alert. The user of the VMS or the users of the mobile agent may determine that the investigation has ended and the CV alert associated with the CV alert is resolved (e.g., abandoned bag obtained, person of interest detained, etc.). In response to the determination, the user of the VMS or the user of a mobile agent may send the notification that the CV alert case is resolved to the VMS. The VMS may forward the notification that the single CV alert case is resolved to the CV nodes performing the distributed CV workload associated with the CV alert case. If the CV nodes obtain, from the VMS, the notification that the CV alert case is resolved, then the CV nodes may determine that the CV alert case is resolved. If the CV nodes do not obtain, from the VMS, the notification that the CV alert case is resolved, then the CV nodes may determine that the CV alert case is not resolved. A determination as to whether the CV alert case is resolved may be made via other and/or additional methods without departing from the invention.

In one or more embodiments of the invention, if it is determined that the CV alert case is resolved, then the method ends following Step 414. As a result, each CV node participating in the distributed CV workload may delete and/or archive the local CV alert case associated with the CV node and stop performing the distributed CV workload. In one or more embodiments of the invention, if it is determined that the CV alert case is not resolved, then the method proceeds to Step 408. Steps 408, 410, 412, and 414 may be repeated until the CV alert case associated with the CV alert is resolved.

SECOND EXAMPLE

The following section describes a second example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to be simple examples to illustrate, at least in part, concepts described herein.

Figure 5:
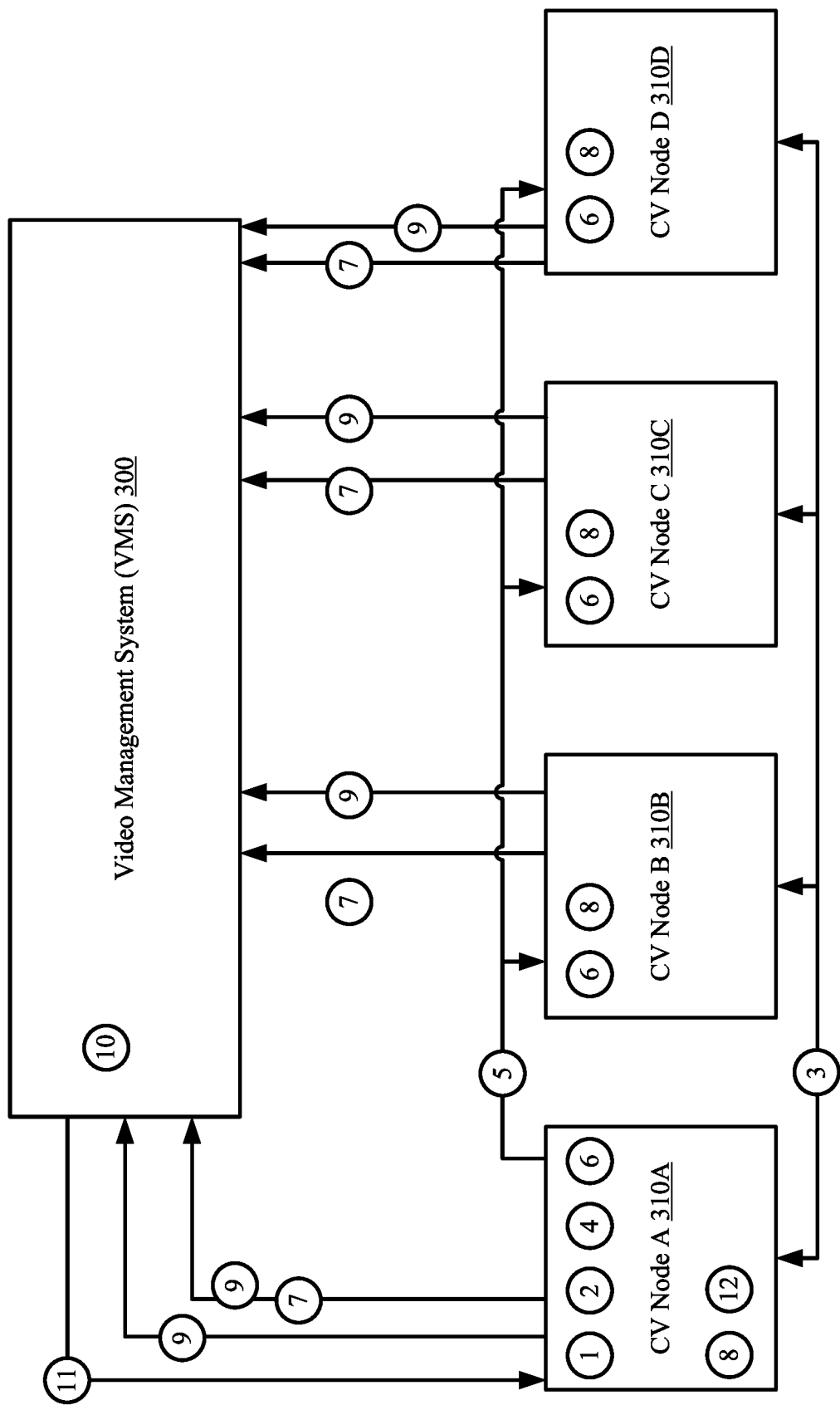
FIG. 5 shows a diagram of a second example in accordance with one or more embodiments of the invention.

Turning to FIG. 5, FIG. 5 shows a diagram of a second example in accordance with one or more embodiments of the invention. Consider a scenario in which a CV environment is operating in an airport. The CV environment includes a video management system (VMS) (300) and four CV nodes: CV node A (310A), CV node B (310B), CV node C (310C), and CV node D (310D). The CV nodes (310A, 310B, 310C, 310D) each are executing a facial recognition CV workload. CV node A (310A) includes a camera recording the security checkpoint of the airport, CV node B (310B) includes a camera recording a terminal of the airport, CV node C (310C) includes a camera recording the baggage claim of the airport, and CV node D (310D) includes a camera recording the parking lot of the airport.

At Step 1, CV node A (310A) identifies a CV alert trigger event. The CV alert trigger event includes identifying a person of interest in an ongoing legal investigation that facial recognition CV workloads executing on the CV nodes (310A, 310B, 310C, 310D) are configured to recognize In response to identifying the CV alert trigger event, at Step 2, CV node A (310A) generates a CV alert and a CV alert case associated with the CV alert. At step 3, CV node A broadcasts a request for CV environment configuration information associated with other CV nodes included in the CV environment. After obtaining the request for CV environment configuration information, CV node B (310B), CV node C (310C), and CV node D (310D) generate and provide their associated CV environment configuration information to CV node A (310A).

At Step 4, CV node A (310A) uses the obtained CV environment configuration information to identify the nearby CV nodes (310B, 310C, 310D). After identifying the nearby CV nodes, at Step 5, CV node A (310A) sends requests and instructions for performing a distributed CV workload associated with tracking the person of interest. In response to obtaining the request and instructions, the nearby CV nodes (310B, 310C, 310D) begin performing the distributed CV workload to track the person of interest throughout the airport. As a result, at Step 6, the CV nodes (310A, 310B, 310C, 310D) generate CV data associated with the person of interest. The CV nodes (310A, 310B, 310C, 310D) update a local CV alert case associated with the person of interest with the generated CV data over time. At Step 7, the CV nodes (310A, 310B, 310C, 310D) then provide the updated local CV alert cases to the VMS (300). The VMS (300) then collates the local CV alert cases into a single alert case. In response to obtaining the local CV alert cases, the VMS (300) initiates investigation of the CV alert case using the CV data associated with the CV alert case. To do so, a user of the VMS (300) may monitor the CV data obtained from the CV nodes (310A, 310B, 310C, 310D) and provide the CV alert case to other users for investigation (e.g., users of mobile agents).

Due to not resolving the CV alert case, at Step 8, the CV nodes (310A, 310B, 310C, 310D) continue to execute the distributed CV workload and generate CV data associated with the person of interest. The CV nodes (310A, 310B, 310C, 310D) update a local CV alert case associated with the person of interest with the generated CV data over time. At Step 9, the CV nodes (310A, 310B, 310C, 310D) then provide the updated local CV alert cases to the VMS (300). The VMS (300) then collates the local CV alert cases into a single alert case. In response to obtaining the local CV alert cases, the VMS (300) initiates investigation of the CV alert case using the CV data associated with the CV alert case. To do so, a user of the VMS (300) may monitor the CV data obtained from the CV nodes (310A, 310B, 310C, 310D) and provide the CV alert case to other users for investigation (e.g., users of mobile agents). After some time, at Step 10, the VMS (300) obtains a notification that the person of interest is detained and the CV alert case is resolved. In response to obtaining the notification, at Step 11, the VMS (300) forwards the notification that the CV alert case is resolved to CV node A (310A). At Step 12, CV node A (310A) then cancels the performance of the distributed CV workload by the CV nodes (310A, 310B, 310C, 310D).

End of Second Example

Figure 6:
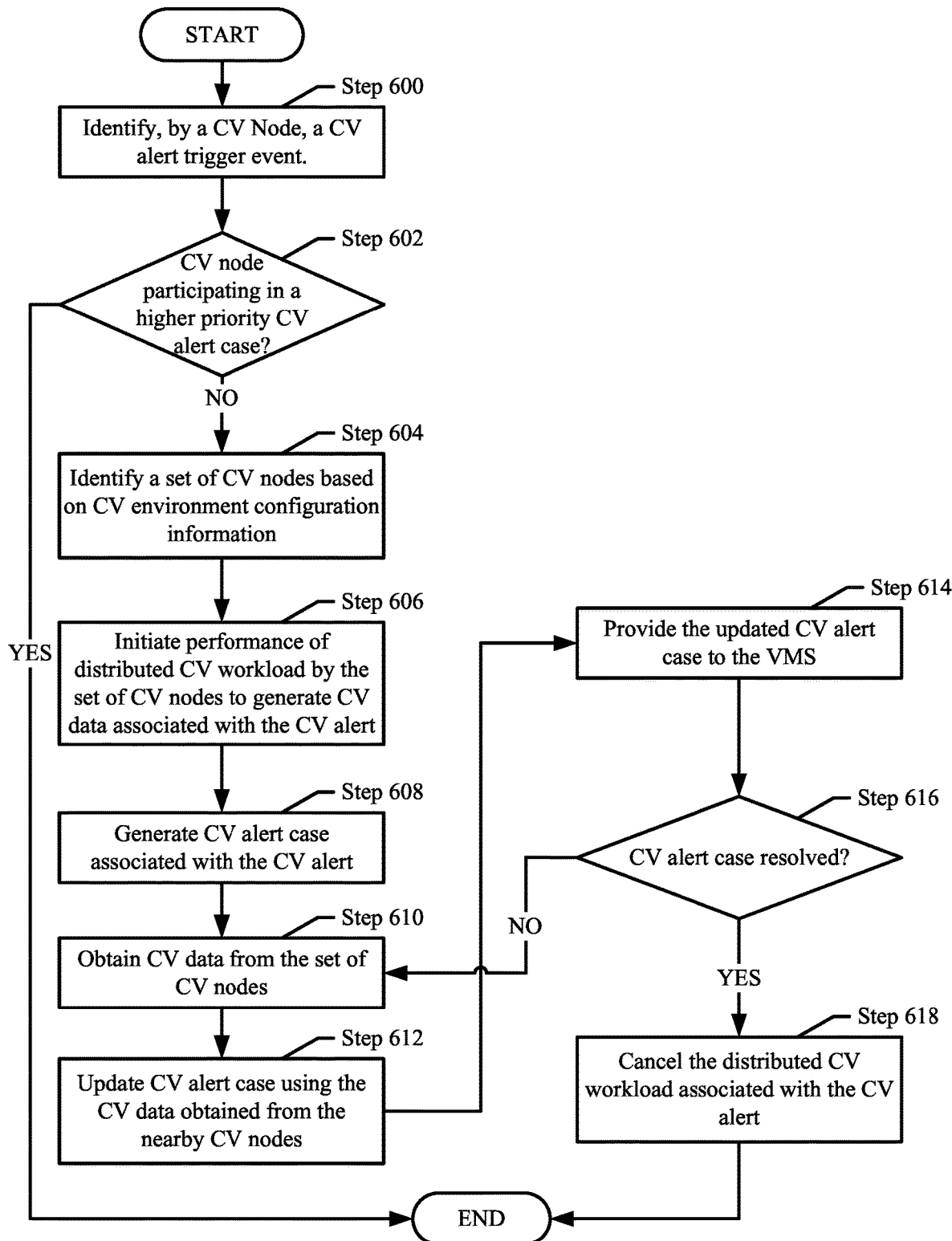
FIG. 6 shows a flowchart of a method for performing a distributed CV workload by a leader CV node in accordance with one or more embodiments of the invention.

FIG. 6 shows a flowchart of a method for performing a distributed CV workload by a leader CV node in accordance with one or more embodiments of the invention. The method shown in FIG. 6 may be performed by, for example, a CV node (e.g., 110A, FIG. 1). Other components of the system in FIG. 1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In Step 600, a CV alert trigger event is identified by a CV node. The CV node may identify a CV alert trigger event using the methods discussed above in Step 200 of FIG. 2A. The CV node may also generate a CV alert based on the CV alert trigger event using the message discussed above in Step 202 of FIG. 2A. The CV alert trigger event may be identified by the CV node via other and/or additional methods without departing from the invention.

In Step 602, a determination is made as to whether the CV node is participating in a higher priority CV alert case. In one or more embodiments of the invention, each CV alert and CV alert case may be associated with a priority. The CV node may include a list of potential CV alerts and the priority associated with each CV alert. The CV node may match the CV alert associated with the CV alert trigger event identified in Step 602 with a CV alert included in the list of potential priority and identify the priority associated with the matching CV alert. The CV node may also maintain a list of CV workloads currently executing on the CV node. The CV node may compare the priority of the newly identified CV alert with the priories associated with the currently executing CV workloads. If the priority of a currently executing CV workload is higher than the priority of the newly identified CV alert, then the CV node may determine that the CV node is participating in a higher priority CV alert case. If the priority of a currently executing CV workload is not higher than the priority of the newly identified CV alert, then the CV node may determine that the CV node is not participating in a higher priority CV alert case. The CV node may determine whether the CV node is participating in a higher priority CV alert case via other and/or additional methods without departing from the invention.

In one or more embodiments of the invention, if it is determined that the CV node is participating in a higher priority CV alert case, the method ends following step 602. In one or more embodiments of the invention, if it is determined that the CV node is not participating in a higher priority CV alert case, the method proceeds to Step 604. As a result, the CV node that identified the CV alert trigger event may become the CV node leader. The CV node leader may manage the performance of the distributed CV workload associated with the CV alert using the following steps.

In Step 604, a set of CV nodes is identified based on CV environment configuration information. As discussed above, the CV environment configuration information may include CV node identifiers, geolocation information, communication information (e.g., network addresses, encryption keys, security/authentication information, etc.), CV workload types included, and availability information associated with other CV nodes included in the CV environment. The CV node leader may use previously obtained CV environment configuration information stored in storage of the CV node. Alternatively, the CV node leader may send or otherwise broadcast requests for CV environment configuration information associated with other CV nodes connected to the network of the CV environment. In response to obtaining the CV environment configuration request, each CV node of the other CV nodes may provide the requested CV environment configuration information associated with the CV node. Similarly, the CV node leader may request and obtain CV environment configuration information from the VMS. The CV node may identify every CV node specified by the CV environment configuration information as a candidate CV node. The candidate CV nodes may be identified based on CV environment configuration information via other and/or additional methods without departing from the invention.

In one or more embodiments of the invention, CV node leader uses the CV environment configuration information and selection parameters to select a set of CV nodes of the candidate CV nodes. The selection parameters may include geolocation parameters (i.e., nearest CV nodes, CV nodes that provide coverage of all, or a portion of the physical environment, etc.), availability parameters (i.e., CV nodes that are available to perform the distributed CV workload), CV workload parameters (i.e., CV nodes executing CV workloads associated with the CV alert), and other and/or additional types of selection parameters without departing from the invention. The CV node leader may use any quantity and/or combination of selection parameters to select the set of CV nodes of the candidate CV nodes. The set of CV nodes may include any quantity or combination of CV nodes of the candidate nodes without departing from the invention. The set of CV nodes of the candidate CV nodes may be selected based on the CV environment configuration information via other and/or additional methods without departing from the invention.

In Step 606, the performance of the distributed CV workload by the set of CV nodes to generate CV data associated with the CV alert is initiated. In one or more embodiments of the invention, the CV node leader sends requests for performing the distributed CV workload to the set of CV nodes. The request may include instructions for executing the distributed CV workload. The request may further include CV data associated with the CV alert. The CV node may send the requests using any appropriate peer-to-peer communication language without departing from the invention. The CV node may use the communication information included in the CV environment configuration information to submit the request to perform the distributed CV workload to the nearby CV nodes.

In response to obtaining the request to perform the CV workloads, each CV node of the set of CV nodes may be executing the distributed workload. As a result, each CV node may generate CV data during the performance of the CV workload. The performance of the distributed workload by the set of CV nodes to generate CV data associated with the CV alert case may be initiated via other and/or additional methods without departing from the invention.

In Step 608, a CV alert case associated with the CV alert is generated. In one or more embodiments of the invention, the CV node leader generates the CV alert case using the CV alert and CV data associated with the CV alert. The CV alert case may be a data structure that includes all information relevant to the CV alert generated by the CV node leader and the set of CV nodes performing the distributed CV workload. The CV alert case may include a CV alert identifier associated with the CV alert. The CV alert case may include other and/or additional information associated with the CV alert without departing from the invention. The CV alert case associated with the CV alert may be generated via other and/or additional methods without departing from the invention.

In Step 610, CV data is obtained from the set of CV nodes. The CV node leader may request for and/or be provided with additional CV data associated with the CV alert as the distributed CV workload is performed by the set of CV nodes. The set of CV nodes may provide the additional CV data associated with the CV alert over time as the distributed CV workload is performed. The CV data may be streamed to the CV node leader in real-time, provided periodically (e.g., sent to the CV node leader every thirty seconds), or provided to the CV node leader based on a request. CV data may be obtained from the set of CV nodes via other and/or additional methods without departing from the invention.

In Step 612, the CV alert case is updated using the CV data obtained from the set of CV nodes. The CV node leader may update the CV alert case with the additional CV data obtained from the set the CV nodes and CV data generated through the performance of the CV workload itself. The CV node leader may update the CV alert case periodically or as CV data is obtained. As a result, the CV node leader may collate the CV data generated by the set of CV nodes during the performance of the distributed CV workload in the CV alert case. The CV alert case may be updated using the CV data obtained from the set of CV nodes via other and/or additional methods without departing from the invention.

In Step 614, the updated CV alert case is provided to the VMS. In one or more embodiments of the invention, the CV node leader provides the updated CV alert case (i.e., or a copy of the updated CV alert case) to the VMS. In one or more embodiments of the invention, the CV node leader sends a message to the VMS. The message may include the updated CV alert case associated with the CV alert. The message may include other and/or additional information without departing from the invention. The message may be sent to the VMS using any appropriate method of data transmission without departing from the invention. As an example, the messages may be transmitted as data packets through one or more network devices that operatively connect the CV node leader to the VMS. The updated CV alert case is provided to the VMS via other and/or additional methods without departing from the invention.

As a result, a user of the VMS may use the updated CV alert case associated with the CV alert to investigate and resolve the CV alert. The VMS may also provide the CV alert and all, or a portion of the CV data to nearby mobile agents, which may in turn, provide the CV alert and the CV data to users to locate, investigate, and resolve the CV alert case.

In Step 616, a determination is made as to whether the CV alert case is resolved. The VMS may obtain a notification that the CV alert case is resolved. The notification may be obtained from a user of the VMS or a mobile agent. As discussed above, a user of the VMS may use the CV alert case to investigate the CV alert. Similarly, users of mobile agents may also investigate the CV alert. The user of the VMS or the users of the mobile agent may determine that the investigation has ended and the CV alert associated with the CV alert is resolved (e.g., abandoned bag obtained, person of interest detained, etc.). In response to the determination, the user of the VMS or the user of a mobile agent may send the notification that the CV alert case is resolved to the VMS. The VMS may forward the notification that the CV alert case is resolved to the CV node leader managing the distributed CV workload associated with the CV alert case. If the CV node leader obtains, from the VMS, the notification that the CV alert case is resolved, then the CV node leader may determine that the CV alert case is resolved. If the CV node leader does not obtain, from the VMS, the notification that the CV alert case is resolved, then the CV node leader may determine that the CV alert case is not resolved. A determination as to whether the CV alert case is resolved may be made via other and/or additional methods without departing from the invention.

In one or more embodiments of the invention, if it is determined that the CV alert case is resolved, then the method may proceed to Step 618. In one or more embodiments of the invention, if it is determined that the CV alert case is not resolved, then the method proceeds to Step 610. Steps 610, 612, 614, and 616 may be repeated until the CV alert case associated with the CV alert is resolved.

In Step 618, the distributed CV workload associated with the CV alert is canceled. In one or more embodiments of the invention, the CV node leader sends requests for canceling the distributed CV workload to the set of CV nodes. The request may include instructions for canceling the distributed CV workload. The CV node leader may send the requests using any appropriate peer-to-peer communication language without departing from the invention. The CV node leader may use the communication information included in the CV environment configuration information to submit the request to cancel the distributed CV workload to the set of CV nodes.

In response to obtaining the request to cancel the distributed CV workload, each CV node of the set of CV nodes may be revert back to performing previous workloads or wait for another request to perform another distributed CV workload. As a result, each CV node participating in the distributed CV workload may delete and/or archive the CV data associated with the distributed CV workload and stop performing the distributed CV workload. The distributed CV workload associated with the CV alert may be canceled via other and/or additional methods without departing from the invention.

In one or more embodiments of the invention, the method ends following Step 618.

THIRD EXAMPLE

The following section describes a third example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to be simple examples to illustrate, at least in part, concepts described herein.

Figure 7:
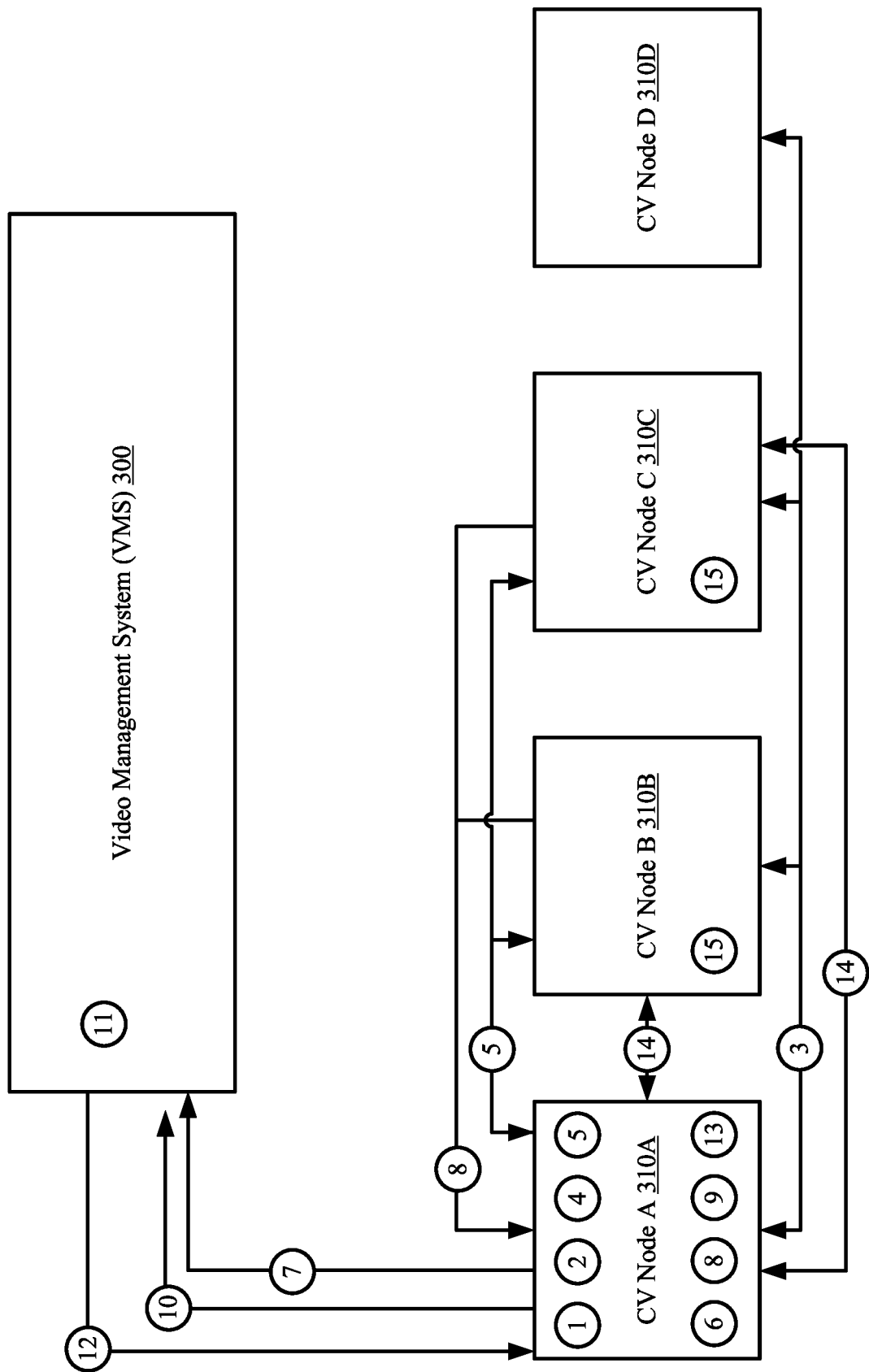
FIG. 7 shows a diagram of a third example in accordance with one or more embodiments of the invention.

Turning to FIG. 7, FIG. 7 shows a diagram of a third example in accordance with one or more embodiments of the invention. Consider a scenario in which a CV environment is operating in an airport. The CV environment includes a video management system (VMS) (300) and four CV nodes: CV node A (310A), CV node B (310B), CV node C (310C), and CV node D (310D). The CV nodes (310A, 310B, 310C, 310D) each are executing a facial recognition CV workload. CV node A (310A) includes a camera recording the security checkpoint of the airport, CV node B (310B) includes a camera recording a terminal of the airport, CV node C (310C) includes a camera recording the parking lot of the airport, and CV node D (310D) includes a camera recording the baggage claim of the airport. CV node A (310A), CV node B (310B), and CV node C (310C) execute facial recognition CV workloads for identifying and tracking persons of interest and CV node D (310D) executes an object detection CV workload for identifying abandoned bags.

At Step 1, CV node A (310A) identifies a CV alert trigger event. The CV alert trigger event includes identifying a person of interest in an ongoing legal investigation. In response to identifying the CV alert trigger event, at Step 2, CV node A (310A) makes a determination that it is not participating in a higher priority CV alert case. In response to the determination, at Step 3, CV node A (310A) becomes the CV node leader for managing the distributed CV workload for identifying and tracking the person of interest. CV node A (310A) then broadcasts a request for CV environment configuration information associated with other CV nodes included in the CV environment. After obtaining the request for CV environment configuration information, CV node B (310B), CV node C (310C), and CV node D (310D) generate and provide their associated CV environment configuration information to CV node A (310A).

At Step 4, CV node A (310A) uses the obtained CV environment configuration information associated with the candidate CV nodes (310A, 310B, 310C, 310D) to select a set of candidate nodes to perform the distributed CV workload. The selection was made using a CV workload selection parameter to select all CV nodes that include a facial recognition CV workload. As a result the set of CV nodes includes CV node A (310A), CV node B (310B), and CV node C (310C). At Step 5, CV node A (310A) sends requests and instructions for performing a distributed CV workload associated with tracking the person of interest to the set of CV nodes (310A, 310B, 310C). In response to obtaining the request and instructions, the set of CV nodes (310A, 310B, 310C) begin performing the distributed CV workload to track the person of interest throughout the airport. As a result, the set of CV nodes (310A, 310B, 310C) generate CV data associated with the person of interest. The set of CV nodes (310A, 310B, 310C) then provide the generated CV data to CV node A (310A).

At Step 6, in response to obtaining the CV data from the set of CV nodes (310A, 310B, 310C), CV node A (310A) generates a CV alert case associated with the distributed CV workload and includes the obtained CV data in the CV alert case. At Step 7, CV node A (310A) provides a copy of the CV alert case to the VMS (300). In response to obtaining the CV alert case, the VMS (300) initiates investigation of the CV alert case using the CV data associated with the CV alert case. To do so, a user of the VMS (300) may monitor the CV data obtained from the set CV nodes (310A, 310B, 310C) and provide the CV alert case to other users for investigation (e.g., users of mobile agents).

Due to not yet resolving the CV alert case, at Step 8, the set of CV nodes (310A, 310B, 310C) continue to execute the distributed CV workload and generate CV data associated with the person of interest. The set of CV nodes (310A, 310B, 310C) then provide the generated CV data to CV node A (310A). At Step 9, in response to obtaining the CV data from the set of CV nodes (310A, 310B, 310C), CV node A (310A) updates the CV alert case associated with the distributed CV workload using the obtained CV data. At Step 10, CV node A (310A) provides a copy of the updated CV alert case to the VMS (300). After some time, at Step 11, the VMS (300) obtains a notification that the person of interest is detained and the CV alert case is resolved. In response to obtaining the notification, at Step 12, the VMS (300) forwards the notification that the CV alert case is resolved to CV node A (310A). Then, at Step 13, CV node A (310A) determines that the CV alert case associated with the distributed CV workload is resolved. In response to the determination, at Step 14, CV node A (310A) then sends requests to cancel the performance of the distributed CV workload by set of CV nodes (310A, 310B, 310C). At Step 15, the set of CV nodes (310A, 310B, 310C) stop executing the distributed CV workload.

End of Third Example

Figure 8:
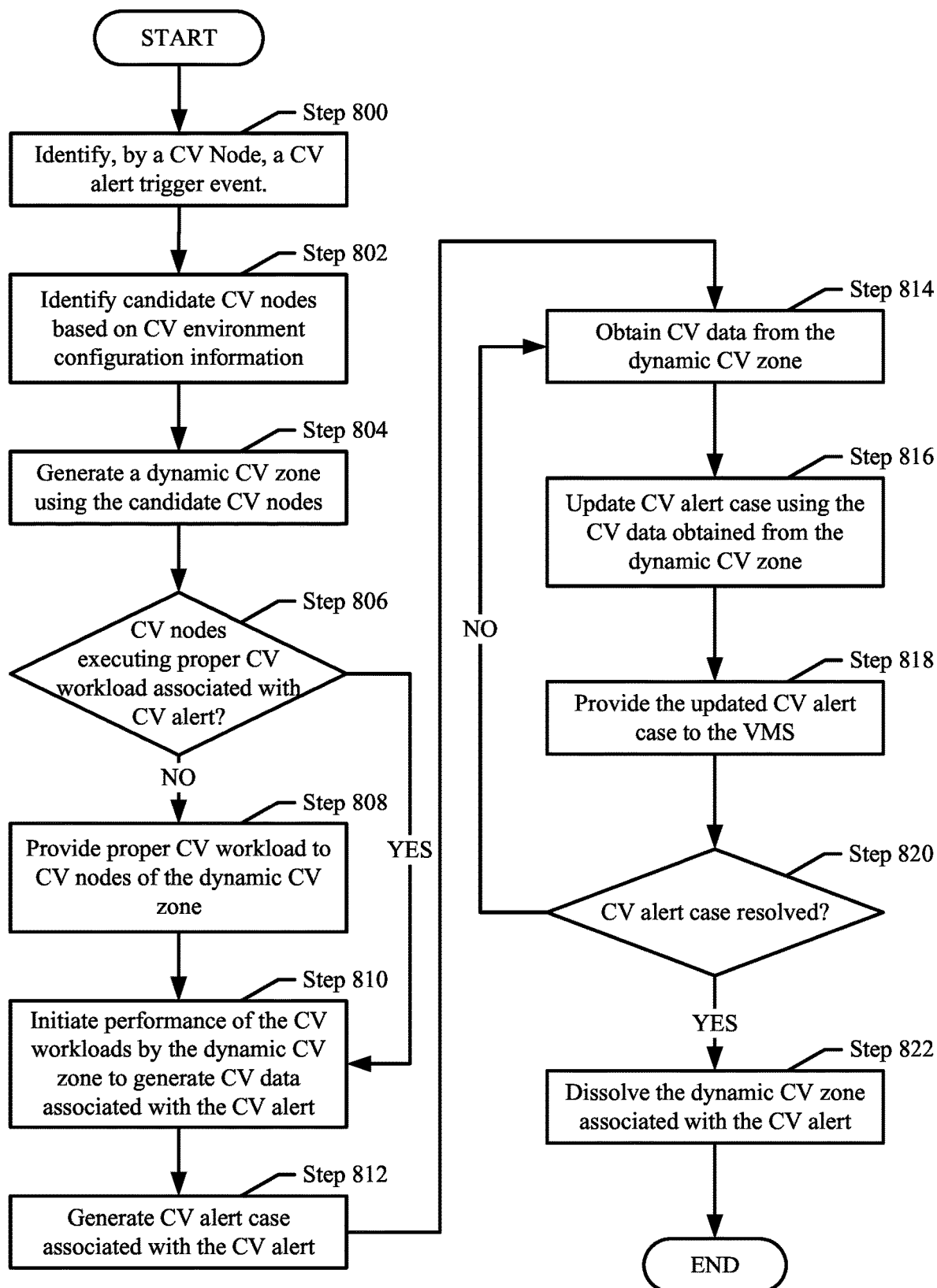
FIG. 8 shows a flowchart of a method for performing a distributed CV workload using a dynamic CV zone in accordance with one or more embodiments of the invention.

FIG. 8 shows a flowchart of a method for performing a distributed CV workload using a dynamic CV zone in accordance with one or more embodiments of the invention. The method shown in FIG. 8 may be performed by, for example, a CV node (e.g., 110A, FIG. 1). Other components of the system in FIG. 1 may perform all, or a portion, of the method of FIG. 8 without departing from the invention.

While FIG. 8 is illustrated as a series of steps, any of the steps may be omitted, performed in a different order, additional steps may be included, and/or any or all of the steps may be performed in a parallel and/or partially overlapping manner without departing from the invention.

In Step 800, a CV alert trigger event is identified by a CV node. The CV node may identify a CV alert trigger event using the methods discussed above in Step 200 of FIG. 2A. The CV node may also generate a CV alert based on the CV alert trigger event using the message discussed above in Step 202 of FIG. 2A. The CV alert trigger event may be identified by the CV node via other and/or additional methods without departing from the invention. As a result, the CV node that identified the CV alert trigger event may become the CV node leader. The CV node leader may manage the performance of the distributed CV workload associated with the CV alert using the following steps.

In Step 802, candidate CV nodes are identified based on CV environment configuration information. As discussed above, the CV environment configuration information may include CV node identifiers, geolocation information, communication information (e.g., network addresses, encryption keys, security/authentication information, etc.), CV workload types included, and availability information associated with other CV nodes included in the CV environment. The CV node leader may use previously obtained CV environment configuration information stored in storage of the CV node. Alternatively, the CV node leader may send or otherwise broadcast requests for CV environment configuration information associated with other CV nodes connected to the network of the CV environment. In response to obtaining the CV environment configuration request, each CV node of the other CV nodes may provide the requested CV environment configuration information associated with the CV node. Similarly, the CV node leader may request and obtain CV environment configuration information from the VMS. The CV node may identify every CV node specified by the CV environment configuration information as a candidate CV node. The candidate CV nodes may be identified based on CV environment configuration information via other and/or additional methods without departing from the invention.

In Step 804, a dynamic CV zone is generated using the candidate CV nodes. In one or more embodiments of the invention, CV node leader uses the CV environment configuration information and selection parameters to select a set of CV nodes of the candidate CV nodes. The selection parameters may include geolocation parameters. The CV node leader may use the geolocation information associated with the candidate CV nodes to select a set of Candidate CV nodes that cover (i.e., collect video data from) a targeted portion of the physical environment associated with CV environment. The CV node leader may use the geolocation information associated with the CV alert in combination with the geolocation information included in the CV environment configuration information to select CV nodes associated with the targeted portion of the physical environment. As an example, the geolocation information associated with a CV alert may specify that a person of interest was moving from the baggage claim to a terminal. Therefore, the CV node leader may select candidate CV nodes associated with geolocation information associated with the terminal. As another example, the CV node leader may use geolocation information to select candidate CV nodes that cover the entire airport. The selected set of CV nodes may be used to generate a dynamic CV zone. The dynamic CV zone may be generated using the candidate CV nodes via other and/or additional methods without departing from the invention.

In Step 806, A determination is made as to whether the CV nodes of the dynamic CV zone are executing the proper CV workload associated with the CV alert. Each CV alert may be associated with a CV workload type and may require each CV node performing a distributed CV workload to include the CV workload type. For example, for a CV alert associated with facial recognition, a distributed workload tracking a person of interest may require CV nodes performing the distributed workload to include a facial recognition CV workload. Therefore, the CV node leader may use the CV environment configuration information to check the CV workloads executing on each CV node of the dynamic CV zone. If the CV workload executing on all the CV nodes of the dynamic CV zone matches the CV workload associated with the CV alert, then the CV node leader may determine that the CV nodes of the dynamic CV zone are executing the proper CV workload associated with the CV alert. If the CV workload executing on a CV nodes of the dynamic CV zone does not match the CV workload associated with the CV alert, then the CV node leader may determine that the CV nodes of the dynamic CV zone are not executing the proper CV workload associated with the CV alert. The determination as to whether the CV nodes of the dynamic CV zone are executing the proper CV workload associated with the CV alert may be made via other and/or additional methods without departing from the invention.

In Step 808, the proper CV workload is provided to the CV nodes of the dynamic CV zone. The CV node leader may identify all CV nodes of the dynamic CV zone that do not include the CV workload associated with the CV alert using the CV environment configuration information as discussed above. The CV node leader may send a message to the identified CV nodes to execute the CV workload associated with the CV alert. The message may include computer instructions (e.g., computer code), which when executed by a processor or controller of the CV node results in the instantiation and execution of the CV workload. In other embodiments of the invention, the CV node leader may send a request to the VMS to instantiate the CV workload on the identified CV nodes of the dynamic CV zone. In response to the request, the VMS may send computer instructions (e.g., computer code), which when executed by a processor or controller of the CV node results in the instantiation and execution of the CV workload. The proper CV workload may be provided to the CV nodes of the dynamic CV zone via other and/or additional methods without departing from the invention.

In Step 810, the performance of the CV workloads by the dynamic CV zone to generate CV data associated with the CV alert is initiated. In one or more embodiments of the invention, the CV node leader sends requests for performing the distributed CV workload to the set of CV nodes. The request may include instructions for executing the distributed CV workload. The request may further include CV data associated with the CV alert. The CV node may send the requests using any appropriate peer-to-peer communication language without departing from the invention. The CV node may use the communication information included in the CV environment configuration information to submit the request to perform the distributed CV workload to the nearby CV nodes.

In response to obtaining the request to perform the CV workloads, each CV node of the set of CV nodes may be executing the CV workloads to perform the distributed workload. As a result, each CV node may generate CV data during the performance of the distributed CV workload. the performance of the CV workloads by the dynamic CV zone to generate CV data associated with the CV alert may be initiated via other and/or additional methods without departing from the invention.

In Step 812, a CV alert case associated with the CV alert is generated. In one or more embodiments of the invention, the CV node leader generates the CV alert case using the CV alert and CV data associated with the CV alert. The CV alert case may be a data structure that includes all information relevant to the CV alert generated by the CV node leader and the set of CV nodes performing the distributed CV workload. The CV alert case may include a CV alert identifier associated with the CV alert. The CV alert case may include other and/or additional information associated with the CV alert without departing from the invention. The CV alert case associated with the CV alert may be generated via other and/or additional methods without departing from the invention.

In Step 814, CV data is obtained from the dynamic CV zone. The CV node leader may request for and/or be provided with additional CV data associated with the CV alert as the distributed CV workload is performed by the dynamic CV zone. The CV nodes of the dynamic CV zone may provide the additional CV data associated with the CV alert over time as the distributed CV workload is performed. The CV data may be streamed to the CV node leader in real-time, provided periodically (e.g., sent to the CV node leader every thirty seconds), or provided to the CV node leader based on a request. CV data may be obtained from the dynamic CV zone via other and/or additional methods without departing from the invention.

In Step 816, the CV alert case is updated using the CV data obtained from the dynamic CV zone. The CV node leader may update the CV alert case with the additional CV data obtained from the dynamic CV zone and CV data generated through the performance of the CV workload itself. The CV node leader may update the CV alert case periodically or as CV data is obtained. As a result, the CV node leader may collate the CV data generated by the set of CV nodes during the performance of the distributed CV workload in the CV alert case. The CV alert case may be updated using the CV data obtained from the dynamic CV zone via other and/or additional methods without departing from the invention.

In Step 818, the updated CV alert case is provided to the VMS. In one or more embodiments of the invention, the CV node leader provides the updated CV alert case (i.e., or a copy of the updated CV alert case) to the VMS. In one or more embodiments of the invention, the CV node leader sends a message to the VMS. The message may include the updated CV alert case associated with the CV alert. The message may include other and/or additional information without departing from the invention. The message may be sent to the VMS using any appropriate method of data transmission without departing from the invention. As an example, the messages may be transmitted as data packets through one or more network devices that operatively connect the CV node leader to the VMS. The updated CV alert case is provided to the VMS via other and/or additional methods without departing from the invention.

As a result, a user of the VMS may use the updated CV alert case associated with the CV alert to investigate and resolve the CV alert. The VMS may also provide the CV alert and all, or a portion of the CV data to nearby mobile agents, which may in turn, provide the CV alert and the CV data to users to locate, investigate, and resolve the CV alert case.

In Step 820, a determination is made as to whether the CV alert case is resolved. The VMS may obtain a notification that the CV alert case is resolved. The notification may be obtained from a user of the VMS or a mobile agent. As discussed above, a user of the VMS may use the CV alert case to investigate the CV alert. Similarly, users of mobile agents may also investigate the CV alert. The user of the VMS or the users of the mobile agent may determine that the investigation has ended and the CV alert associated with the CV alert is resolved (e.g., abandoned bag obtained, person of interest detained, etc.). In response to the determination, the user of the VMS or the user of a mobile agent may send the notification that the CV alert case is resolved to the VMS. The VMS may forward the notification that the CV alert case is resolved to the CV node leader managing the distributed CV workload associated with the CV alert case. If the CV node leader obtains, from the VMS, the notification that the CV alert case is resolved, then the CV node leader may determine that the CV alert case is resolved. If the CV node leader does not obtain, from the VMS, the notification that the CV alert case is resolved, then the CV node leader may determine that the CV alert case is not resolved. A determination as to whether the CV alert case is resolved may be made via other and/or additional methods without departing from the invention.

In one or more embodiments of the invention, if it is determined that the CV alert case is resolved, then the method may proceed to Step 822. In one or more embodiments of the invention, if it is determined that the CV alert case is not resolved, then the method proceeds to Step 814. Steps 814, 816, 818, and 820 may be repeated until the CV alert case associated with the CV alert is resolved.

In Step 822, the dynamic CV zone associated with the CV alert is dissolved. In one or more embodiments of the invention, the method ends following Step 822. In one or more embodiments of the invention, the CV node leader sends requests for dissolving the dynamic CV zone to the CV nodes of the dynamic CV zone. The request may include instructions for canceling the distributed CV workload. The CV node leader may send the requests using any appropriate peer-to-peer communication language without departing from the invention. The CV node leader may use the communication information included in the CV environment configuration information to submit the request to cancel the distributed CV workload to the CV nodes of the dynamic CV zone.

In response to obtaining the request to dissolve the dynamic CV zone, each CV node of the dynamic CV zone may be revert back to performing previous CV workloads or wait for another request to perform another distributed CV workload. As a result, each CV node participating in the distributed CV workload may delete and/or archive the CV data associated with the distributed CV workload and stop performing the distributed CV workload. The dynamic CV zone associated with the CV alert may be dissolved via other and/or additional methods without departing from the invention.

In one or more embodiments of the invention, the method ends following Step 822.

FOURTH EXAMPLE

The following section describes a third example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to be simple examples to illustrate, at least in part, concepts described herein.

Figure 9:
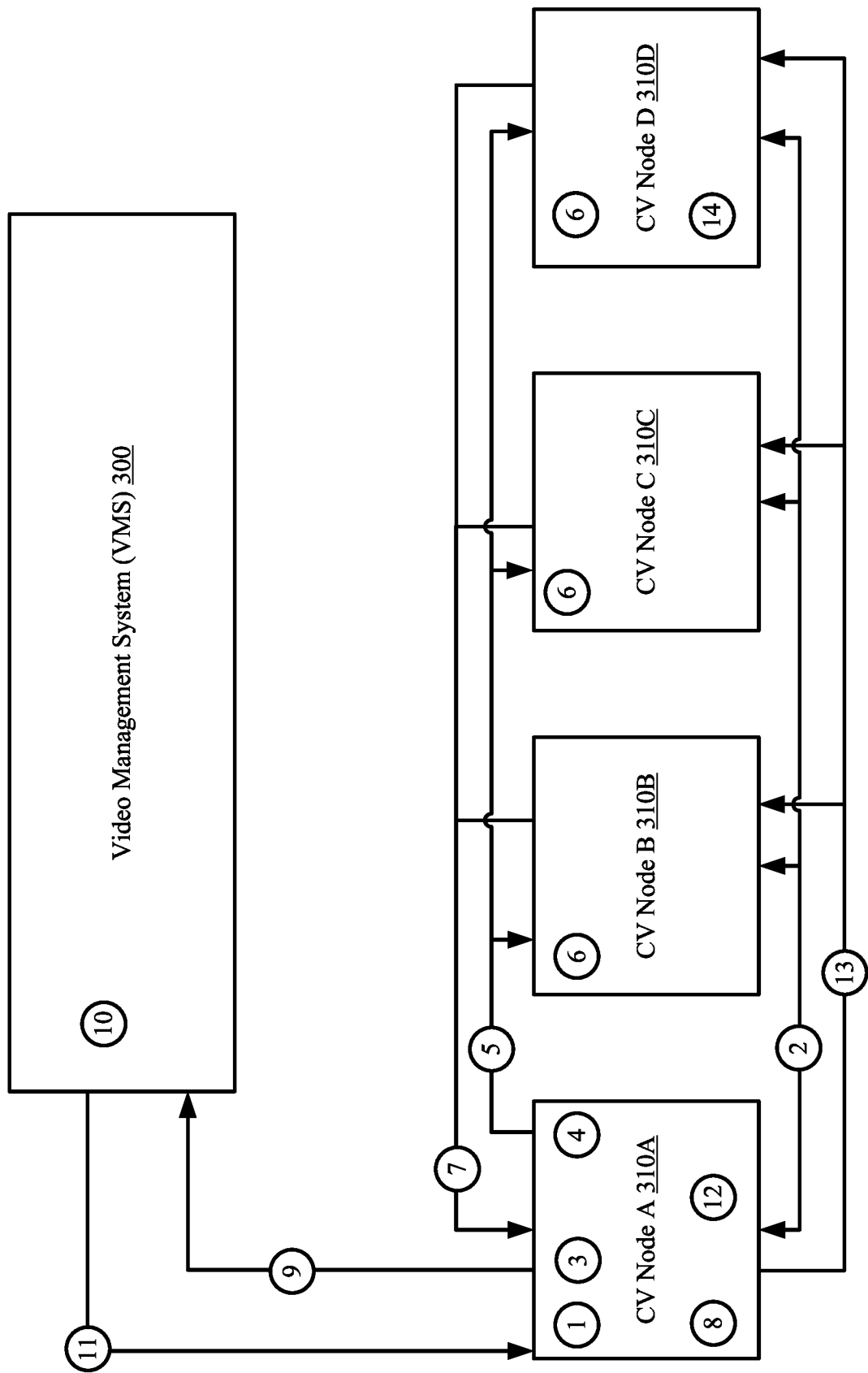
FIG. 9 shows a diagram of a fourth example in accordance with one or more embodiments of the invention.

Turning to FIG. 9, FIG. 9 shows a diagram of a fourth example in accordance with one or more embodiments of the invention. Consider a scenario in which a CV environment is operating in an airport. The CV environment includes a video management system (VMS) (300) and four CV nodes: CV node A (310A), CV node B (310B), CV node C (310C), and CV node D (310D). The CV nodes (310A, 310B, 310C, 310D) each are executing a facial recognition CV workload. CV node A (310A) includes a camera recording the security checkpoint of the airport, CV node B (310B) includes a camera recording a terminal of the airport, CV node C (310C) includes a camera recording the parking lot of the airport, and CV node D (310D) includes a camera recording the baggage claim of the airport. CV node A (310A), CV node B (310B), and CV node C (310C) execute facial recognition CV workloads for identifying and tracking persons of interest and CV node D (310D) executes an object detection CV workload for identifying abandoned bags.

At Step 1, CV node A (310A) identifies a CV alert trigger event. The CV alert trigger event includes identifying a person of interest in an ongoing legal investigation. In response to identifying the CV alert trigger event, at Step 2, CV node A (310A) becomes the CV node leader for managing the distributed CV workload for identifying and tracking the person of interest. CV node A (310A) then broadcasts a request for CV environment configuration information associated with other CV nodes included in the CV environment. After obtaining the request for CV environment configuration information, CV node B (310B), CV node C (310C), and CV node D (310D) generate and provide their respective CV environment configuration information to CV node A (310A).

At Step 3, CV node A (310A) uses the obtained CV environment configuration information associated with the candidate CV nodes (310A, 310B, 310C, 310D) to generate a dynamic CV zone to perform the distributed CV workload. The selection was made using a geolocation information selection parameter to select CV nodes that maximizes the coverage of the dynamic CV zone. As a result, the dynamic CV zone includes CV node A (310A), CV node B (310B), CV node C (310C), and CV node D (310D). At step 4, CV node A (310A) determines, based on the obtain CV environment configuration information, that CV node D is not executing the CV workload associated with the distributed CV workload, and therefore requires the facial recognition CV workload. At Step 5, CV node A (310A) sends requests and instructions for performing a distributed CV workload associated with tracking the person of interest to the set of CV nodes (310A, 310B, 310C). Similarly, CV node A (310A) sends instructions for instantiating a facial recognition CV workload to CV node D (310D) along with a request and instructions for performing the distributed CV workload. In response to obtaining the request and instructions, the dynamic CV zone (310A, 310B, 310C, 310D) begin performing the distributed CV workload to track the person of interest throughout the airport. As a result, at Step 6, the dynamic CV zone (310A, 310B, 310C, 310D) generates CV data associated with the person of interest. The dynamic CV zone (310A, 310B, 310C, 310D), at Step 7, then provides the generated CV data to CV node A (310A).

At Step 8, in response to obtaining the CV data from the dynamic CV zone (310A, 310B, 310C, 310D), CV node A (310A) generates a CV alert case associated with the distributed CV workload and includes the obtained CV data in the CV alert case. At Step 9, CV node A (310A) provides a copy of the CV alert case to the VMS (300). In response to obtaining the CV alert case, the VMS (300) initiates investigation of the CV alert case using the CV data associated with the CV alert case. To do so, a user of the VMS (300) may monitor the CV data obtained from the set CV nodes (310A, 310B, 310C) and provide the CV alert case to other users for investigation (e.g., users of mobile agents).

After some time, at Step 10, the VMS (300) obtains a notification that the person of interest is detained and the CV alert case is resolved. In response to obtaining the notification, at Step 11, the VMS (300) forwards the notification that the CV alert case is resolved to CV node A (310A). Then, at Step 12, CV node A (310A) determines that the CV alert case associated with the distributed CV workload is resolved. In response to the determination, at Step 13, CV node A (310A) then dissolves the dynamic CV zone by sending requests to cancel the performance of the distributed CV workload by the CV nodes of the dynamic CV zone (310A, 310B, 310C, 310D). As a result, the CV nodes (310A, 310B, 310C, 310D) stop executing the distributed CV workload. Additionally, at Step 14, CV node D (310D) reverts back to executing the object detection CV workload to identify abandoned bags.

End of Fourth Example

As discussed above, embodiments of the invention may be implemented using computing devices. FIG. 10 shows a diagram of a computing device in accordance with one or more embodiments of the invention. The computing device (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (not shown) (e.g., a local area network (LAN), a wide area network (WAN) such as the Internet, mobile network, or any other type of network) and/or to another device, such as another computing device.

In one embodiment of the invention, the computing device (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to performing a distributed CV workload using a dynamic CV zone. A CV node may identify a CV alert. In response to identifying the CV alert, the CV node may become the CV node leader associated with the CV alert. The CV node leader may identify other candidate CV nodes. The CV node leader may select a set of the candidate nodes based on geolocation information to select CV nodes that provide an optimal video camera coverage associated with a portion of the physical environment corresponding to the CV alert. The CV node leader may generate a dynamic CV zone using the selected CV nodes. The CV node leader may then provide CV workloads associated with the CV alert to CV nodes of the dynamic CV zone that do include them. The CV node leader may then initiate the performance of a distributed CV workload to generate CV data associated with the CV alert by the dynamic CV zone. As a result, by selecting CV nodes of the candidate CV nodes to perform the distributed CV workload based on geolocation information and providing CV workloads associated with the CV alert to CV nodes of the dynamic CV zone, CV nodes that are located in areas more relevant to the distributed CV workload and that include the proper CV workload may be used to perform the distributed CV workload. Therefore, the efficiency and effectiveness of performing CV workloads to generate CV data associated with CV alerts may be improved.

Thus, embodiments of the invention may address the problem of inefficient use of computing resources to perform computer vision workloads. This problem arises due to the technological nature of the computer vision environment in which the computer vision workloads are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing a computer vision environment, the method comprising:
   identifying, by a computer vision (CV) node of a plurality of CV nodes, a CV alert, wherein the plurality of CV nodes are operably connected over a network, and at least one of the plurality of CV nodes comprises a physical camera;
   in response to identifying the CV alert:
   identifying candidate CV nodes of the plurality of CV nodes;
   generating a dynamic CV zone using the candidate CV nodes;
   making a determination that a CV node of the dynamic CV zone does not include a CV workload associated with the CV alert;

in response to the determination:
  receiving a request, via computer-readable code, to instantiate the CV workload on the CV node of the dynamic CV zone;
  in response to the request, instantiating the CV workload on the CV node of the dynamic CV zone;
  initiating, in response to the instantiating, performance of the CV workload by the dynamic CV zone to generate CV data associated with the CV alert, wherein initiating the performance comprises:
    requesting the CV node generate a first portion of the CV data using the CV workload,
    making a determination that a second CV node of the dynamic CV zone does not include the CV workload, wherein the second CV node is one of the candidate CV nodes,
    in response to the determination:
      sending the CV workload to the second CV node, and
      requesting the second CV node to generate a second portion of the CV data using the CV workload;
  generating a CV alert case associated with the CV alert, wherein the CV alert case is a data structure;
  obtaining the CV data from the dynamic CV zone;
  updating the CV alert case using the CV data generated during the performance of the CV workload; and
  providing the updated CV alert case to a video management system (VMS).

2. The method of claim 1, wherein the candidate CV nodes are identified based on geolocation information associated with the candidate CV nodes.

3. The method of claim 2, wherein identifying candidate CV nodes of the plurality of CV nodes comprises:
  requesting, by the CV node, geolocation information associated with the plurality of CV nodes from the plurality of CV nodes; and
  identifying the candidate CV nodes based on a the geolocation information.

4. The method of claim 1, wherein the CV alert is generated by the CV workload executing on the CV node.

5. The method of claim 1, wherein the CV alert case further comprises:
  video data associated with the CV alert.

6. The method of claim 1, further comprising:
  after providing the updated CV alert case to the VMS:
    making a determination that the CV alert case is resolved; and
    in response to the determination that the CV alert is resolved:
      dissolving the dynamic CV zone.

7. A non-transitory computer readable medium comprising computer readable program code, which when executed by a computer processor enables the computer processor to perform a method for managing a computer vision environment, the method comprising:
  identifying, by a computer vision (CV) node of a plurality of CV nodes, a CV alert, wherein the plurality of CV nodes are operably connected over a network, and at least one of the plurality of CV nodes comprises a physical camera;
  in response to identifying the CV alert:
    identifying candidate CV nodes of the plurality of CV nodes;
    generating a dynamic CV zone using the candidate CV nodes;
    making a determination that a CV node of the dynamic CV zone does not include a CV workload associated with the CV alert;
    in response to the determination:
      receiving a request, via computer-readable code, to instantiate the CV workload on the CV node of the dynamic CV zone;
      in response to the request, instantiating the CV workload on the CV node of the dynamic CV zone;
      initiating, in response to the instantiating, performance of the CV workload by the dynamic CV zone to generate CV data associated with the CV alert, wherein initiating the performance comprises:
        requesting the CV node generate a first portion of the CV data using the CV workload,
        making a determination that a second CV node of the dynamic CV zone does not include the CV workload, wherein the second CV node is one of the candidate CV nodes,
        in response to the determination:
          sending the CV workload to the second CV node, and
          requesting the second CV node to generate a second portion of the CV data using the CV workload;
      generating a CV alert case associated with the CV alert, wherein the CV alert case is a data structure;
      obtaining the CV data from the dynamic CV zone;
      updating the CV alert case using the CV data generated during the performance of the CV workload; and
      providing the updated CV alert case to a video management system (VMS).

8. The non-transitory computer readable medium of claim 7, wherein the candidate CV nodes are identified based on geolocation information associated with the candidate CV nodes.

9. The non-transitory computer readable medium of claim 8, wherein identifying candidate CV nodes of the plurality of CV nodes comprises:
  requesting, by the CV node, geolocation information associated with the plurality of CV nodes from the plurality of CV nodes; and
  identifying the candidate CV nodes based on a the geolocation information.

10. The non-transitory computer readable medium of claim 7, wherein the CV alert is generated by the CV workload executing on the CV node.

11. The non-transitory computer readable medium of claim 7, wherein the CV alert case further comprises:
  video data associated with the CV alert.

12. The non-transitory computer readable medium of claim 7, he method further comprising:
  after providing the updated CV alert case to the VMS:
    making a determination that the CV alert case is resolved; and
    in response to the determination that the CV alert is resolved:
      dissolving the dynamic CV zone.

13. A system, comprising:
  a computer vision (CV) environment comprising a plurality of CV nodes and a video management system (VMS), wherein the plurality of CV nodes are operably connected over a network, and at least one of the plurality of CV nodes comprises a physical camera; and
a CV node of the plurality of CV nodes, comprising a processor and memory, programmed to:
identify a CV alert;
in response to identifying the CV alert:
- identify candidate CV nodes of the plurality of CV nodes;
- generate a dynamic CV zone using the candidate CV nodes;
- make a determination that a CV node of the dynamic CV zone does not include a CV workload associated with the CV alert;
- in response to the determination:
  - receive a request, via computer-readable code, to instantiate the CV workload on the CV node of the dynamic CV zone;
  - in response to the request, instantiate the CV workload on the CV node of the dynamic CV zone;
  - initiate, in response to the instantiating, performance of a CV workload by the dynamic CV zone to generate CV data associated with the CV alert, wherein initiating the performance comprises:
    - requesting the CV node generate a first portion of the CV data using the CV workload,
    - making a determination that a second CV node of the dynamic CV zone does not include the CV workload, wherein the second CV node is one of the candidate CV nodes,
    - in response to the determination:
      - sending the CV workload to the second CV node, and
      - requesting the second CV node to generate a second portion of the CV data using the CV workload;
  - generate a CV alert case associated with the CV alert, wherein the CV alert case is a data structure;
  - obtain the CV data from the dynamic CV zone;
  - update the CV alert case using the CV data generated during the performance of the CV workload; and
  - provide the updated CV alert case to a video management system (VMS).

14. The system of claim 13, wherein the candidate CV nodes are identified based on geolocation information associated with the candidate CV nodes.

15. The system of claim 14, wherein identifying candidate CV nodes of the plurality of CV nodes comprises:
- requesting, by the CV node, geolocation information associated with the plurality of CV nodes from the plurality of CV nodes; and
- identifying the candidate CV nodes based on a the geolocation information.

* * * * *